US011120095B2

(12) United States Patent
Askarian et al.

(10) Patent No.: US 11,120,095 B2
(45) Date of Patent: Sep. 14, 2021

(54) REFACTORING OF STATIC MACHINE-READABLE CODES

(71) Applicant: The DTX Company, New York, NY (US)

(72) Inventors: Ahmad Askarian, Philadelphia, PA (US); Richard James Przekop, Weston, MA (US); Neil Wayne Cohen, Oakton, VA (US); Patrik Andrew Devlin, New York, NY (US); Timothy J. Lemmon, New York, NY (US)

(73) Assignee: the dtx company, New York, NY (US)

( * ) Notice: Subject to any disclaimer, the term of this patent is extended or adjusted under 35 U.S.C. 154(b) by 0 days.

(21) Appl. No.: 17/178,955

(22) Filed: Feb. 18, 2021

(65) Prior Publication Data

US 2021/0256086 A1    Aug. 19, 2021

Related U.S. Application Data

(60) Provisional application No. 62/978,136, filed on Feb. 18, 2020.

(51) Int. Cl.
*G06F 16/95* (2019.01)
*G06F 16/955* (2019.01)
(Continued)

(52) U.S. Cl.
CPC ...... *G06F 16/9554* (2019.01); *G06F 16/9535* (2019.01); *G06F 16/9558* (2019.01); *G06F 16/9566* (2019.01); *G06K 19/06009* (2013.01)

(58) Field of Classification Search
CPC .......................................... G06F 16/954–9566
See application file for complete search history.

(56) References Cited

U.S. PATENT DOCUMENTS

| 10,375,060 B1* | 8/2019 | Graves | H04L 63/06 |
| 2002/0032791 A1* | 3/2002 | Isherwood | G06Q 30/02 |
| | | | 709/230 |

(Continued)

OTHER PUBLICATIONS www.medium.com, Punit Pathak, "ETL—Understanding It and Effectively Using It," https://medium.com/hashmapinc/etl-understanding-it-and-effectively-using-it-f827a5b3e54d, Jan. 7, 2019.

(Continued)

*Primary Examiner* — Robert W Beausoliel, Jr.
*Assistant Examiner* — Nirav K Khakhar
(74) *Attorney, Agent, or Firm* — Weiss & Arons LLP

(57) ABSTRACT

Methods, devices and systems for computing interactive customized content in response to a scan of a machine-readable label are provided. Illustrative methods may include receiving, from a user, a scan of a machine-readable optical label captured using a camera of a mobile device. Methods may include determining, based on the scan, a redirect Uniform Resource Locator (URL). Methods may include generating, based on a user profile and a redirect service that is accessed using the redirect URL, comprising the customized content associated with the scan. Methods may include redirecting the user to a target landing page URL, and providing, to the user through a browser on the mobile device, a target landing page that includes the customized content.

20 Claims, 17 Drawing Sheets

(51) Int. Cl.
*G06K 19/06* (2006.01)
*G06F 16/9535* (2019.01)

(56) References Cited

U.S. PATENT DOCUMENTS

| | | | | |
|---|---|---|---|---|
| 2002/0139839 | A1* | 10/2002 | Catan | G06F 16/38 235/375 |
| 2009/0094175 | A1 | 4/2009 | Proves et al. | |
| 2009/0240816 | A1 | 9/2009 | Philyaw et al. | |
| 2012/0016678 | A1 | 1/2012 | Gruber et al. | |
| 2012/0278465 | A1* | 11/2012 | Johnson | G06Q 50/16 709/223 |
| 2013/0297430 | A1* | 11/2013 | Soergel | G06K 19/06037 705/14.73 |
| 2014/0095461 | A1* | 4/2014 | Burt | G06F 16/9562 707/706 |
| 2015/0006702 | A1 | 1/2015 | Lakes et al. | |
| 2016/0063129 | A1 | 3/2016 | Lim et al. | |
| 2018/0365330 | A1* | 12/2018 | Lin | G06F 16/9554 |
| 2019/0089757 | A1* | 3/2019 | Sorensen | G06F 21/445 |
| 2019/0281124 | A1* | 9/2019 | Lim | H04W 4/021 |

OTHER PUBLICATIONS

Strathmore University (Nairobi, Kenya), Kizi Dimira Othuon, "Improving Customer Experience Using an Android Barcode Reader Application," https://su-plus.strathmore.edu/bitstream/handle/11071/5978/Improving%20customer%20shopping%20experience%20using%20an%20Android%20barcode%20reader%20application.pdf?sequence=l&isAllowed=y, Apr. 2018.

International Searching Authority (ISA/US), International Search Report for International Application No. PCT/US2021/018539, dated May 7, 2021.

* cited by examiner

REFACTORING OF STATIC MACHINE-READABLE CODES

CROSS REFERENCE TO RELATED APPLICATION

This application is a nonprovisional of U.S. Patent Application No. 62/978,136 filed on Feb. 18, 2020, which is hereby incorporated by reference herein in its entirety.

FIELD OF TECHNOLOGY

This disclosure relates to digital platforms, and more particularly to generating customized digital content in response to scanning a machine-readable label.

BACKGROUND

Machine-readable labels, such as quick-response ("QR") codes, provide businesses with a fast and efficient medium for connecting with consumers. Instructions, such as URLs, contact information and other alphanumeric information may be encoded in QR codes. Businesses may leverage QR codes to guide consumers to a desired destination (real or virtual) where the customers can access products, services and information provided by the business. However, a scanning device is needed to scan and interpret the instructions encoded in a QR code.

In 2010, 62.6 million people in the United States used smartphones. In 2020 that number is predicted to more than quadruple to 272.6 million. Commensurate with increased smartphone use is integration of technology into smartphones that scans and interprets machine-readable labels. Today, many smartphones include a native camera application that recognizes machine-readable labels such as QR codes. There is no need to download and install a separate application or use a separate reader to scan a machine-readable label.

Machine-readable labels now potentially offer an inexpensive means of providing consumers with easy access to products, services or information. Consumers are already using their smartphones to search for information about a product/service of interest. Now, businesses can tap into this tendency by using machine-readable labels to guide consumers to targeted content associated with a product/service. Furthermore, machine-readable labels are inexpensive and easy to print on a variety of surfaces such as business cards, product packaging, posters or marketing materials.

A hurdle facing widespread adoption of machine-readable labels is that the instructions encoded in each label is identical. Each customer that scans a label, conventionally, will be directed to an identical URL or process the identical information encoded within the QR code. However, each customer may have different needs or interests. A first customer may be interested in contacting customer service for a question about a product. A second customer may be interested in purchasing a new product. A third customer may be interested in returning a product.

Another hurdle facing widespread adoption of machine-readable labels is that the instructions encoded in such labels are not easily changed. Contact information or a URL associated with a business may change. Yet, the machine-readable label may still encode old contact information or an old URL. Machine-readable labels may be printed and affixed to real property. It is costly to remove these machine-readable labels and replace them with updated labels.

It would be desirable to provide apparatus and methods for refactoring machine-readable labels such as QR codes to provide customized content to each consumer that scans or extracts information from a machine-readable label. Accordingly, it is desirable to provide apparatus and methods for REFACTORING OF STATIC MACHINE-READABLE CODES.

SUMMARY

Embodiments of the disclosed technology relate to providing customized digital content for interactions between two or more parties. Such interactions may include, but not be limited to, commercial sales transactions between a buyer and a seller, engagement actions between a reader and a publisher, advertising interactions between a consumer and an advertiser. The disclosed embodiments can, for example, be used in direct-to-consumer ("DTC") markets and DTC retail transactions.

In an exemplary aspect, a method for providing a user with customized digital content on a mobile device is disclosed. Methods includes receiving, from the user, information encoded in a machine-readable optical label. The information may be captured optically, using a camera of the mobile device. The information may be captured in any suitable manner. For example, the information may be captured using near field communication ("NFC"), Bluetooth, 5G communication between the machine-readable label and the user's mobile device. Methods may include using any suitable technology or protocol for capturing information encoded in a machine-readable label. Any suitable technology for capturing information encoded in a machine-readable label may be referred to herein as a "scan" of a machine-readable label. A device that captures information encoded in a machine-readable label may be referred to herein as a "scanning device."

Methods may include, determining, based on scanning information encoded in a label, a redirect Uniform Resource Locator ("URL"). Methods may include determining, based on a user profile and a redirect service, a landing page URL.

A redirect service may be accessed using the redirect URL. For example, the machine-readable label may encode instructions that trigger the scanning device that captures the encoded information to perform a target action or function. Methods may include providing a landing page to the user through a browser on the scanning device. The landing page presented in the browser may be based on the landing page URL. The landing page may include content customized based on one or more scan event details associated with the scan of the machine-readable optical label.

In yet another exemplary aspect, the above-described methods are embodied in the form of processor-executable code and stored in a computer-readable program medium. In yet another exemplary embodiment, a device that is configured or operable to perform the above-described methods is disclosed. The above and other aspects and their implementations are described in greater detail in the drawings, disclosure, and claims.

BRIEF DESCRIPTION OF THE DRAWINGS

The objects and advantages of this disclosure will be apparent upon consideration of the following disclosure, taken in conjunction with the accompanying drawings, in which like reference characters refer to like parts throughout, and in which.

DETAILED DESCRIPTION

Figure 1:
FIG. 1 shows an illustrative machine-readable optical label in accordance with principles of the disclosure.

Embodiments of the disclosed technology may be leveraged to deliver a truly exceptional user experience in response to scanning a machine-readable label. The disclosed technology may include generated customized content for specific user needs, interests, and situations. The disclosed technology may include generated customized content that is continually updated based on user engagement. For example, in response to a scan of a machine-readable label, machine learning algorithms may utilize a user profile or user persona to dynamically generate customized content for the user in real-time. An exemplary user profile may include user preferences, such as previous purchasing and browsing activity of the user and user demographic information.

An artificial intelligence ("AI") method for dynamically generating customized content for a user is provided. The content may include a target landing page. The target landing page may be a webpage that is generated in response to scanning of a machine-readable optical label.

An illustrative machine-readable label may include a plurality of modules. A module may be a dark module or a light module. A scanning device, such as a mobile device, may be configured to interpret instructions encoded by a pattern of light and dark modules. A camera of the mobile device may be used to capture a scan of the machine-readable label. The scanning device may interpret the pattern of modules. For example, a light module may represent a 0, and a dark module may represent a 1.

A machine-readable label may be a label such as a Quick Response ("QR") code or a linear barcode that is read optically. A machine-readable label may transmit information encoded in the label using any suitable signal or communication protocol that be received by a scanning device. For example, a machine-readable label may include an embedded passive or active radio-frequency identification ("RFID") tag. A machine-readable label may transmit encoded information over a cellular network. A machine-readable label may transmit encoded information over a Wi-Fi network.

The machine-readable label may be "static." A "static" label may encode a single set of instructions that are presented to multiple users and/or mobile devices. A static label may encode any suitable information such as a Uniform Resource Locator ("URL"), contact information associated with a business or other alphanumeric information and instructions that trigger the scanning device to perform a target action or function.

For example, information encoded in a scanned label may trigger launching of a web browser resident on the scanning device and loading of a target landing page. The information encoded in a scanned label may trigger any suitable function. Other illustrative functions may include initiating a phone call or a video conference, launching an email/text application on the scanning device and formulating a pre-formatted message to a target destination.

A machine-readable label may be presented on any suitable substrate. For example, a static machine-readable label may be printed on a sticker, displayed on a billboard, generated on a mobile device, displayed during a TV broadcast, or embedded in a video. A static machine-readable label may present the single set of instructions regardless of the substrate used to present the static label.

AI methods may include receiving a scan of a static machine-readable optical label. The scan may be captured using a camera of a mobile device. The mobile device may be operated by a user. Methods may include determining, based on the captured scan, a redirect URL. Methods may include interpreting the instructions encoded by a pattern of light and dark modules in the static machine-readable optical label. The encoded instructions may include a redirect URL.

After the scanning device extracts the redirect URL, methods may include determining a landing page. The landing page may include content customized for the user of the scanning device. The landing page may include content customized for the display on the mobile device used to scan the static machine-readable optical label. The landing page may include content customized for the user based on one or more scan event details. Illustrative scan event details may include a scan time, scan location, weather at the scan time, user physiological characteristics, (fingerprint, facial scan, heart rate) and user demographic information. Scan event details may be determined by the mobile device that scans the static machine-readable optical label. For example, the scanning device may capture a timestamp, a GPS location and a user facial scan.

The customized content may be determined based on a profile of the user. A user profile may include multiple attributes representative of the user. The multiple attributes may be stored within a multi-dimensional matrix, a graph or any suitable data structure. Data structures may store attributes associated with multiple users.

Attributes representative of a user may include user preferences, scan event details, previous purchasing and browsing activity of the user, scanning devices used by the user, user demographic information and user behavioral information. For example, the user profile may be determined based on a browsing and purchasing history of the user (e.g., which websites or online chatrooms has the user frequented in the last 30, 60 or 90 days), user preferences (e.g., favorite brands, favorite movies or TV shows, etc.), and user demographic information (e.g., gender, age, marital status, income, etc.). Data structures may store relationships linking attributes of multiple users. For example, attributes representative of a user may include attributes or profiles associated with other users that share one or more attributes included in the profile of the scanning user. Attributes may include scan event details.

Methods may include computing correlations between attributes stored in the multi-dimensional matrix and/or a user profile. Methods may include computing correlations among attributes stored in the multi-dimensional matrix and/or a user profile and a given set of scan event details. Based on the computed correlations, methods may include determining a landing page for a user. A feedback mechanism may dynamically update the multi-dimensional matrix and/or user profile based on the current engagement (or the most recent N engagements) of the user with a landing page or other activity performed using the mobile device.

For example, a machine-readable label may encode a link to a target webpage. The target webpage itself may include a plurality of links to other webpages. The links may connect a first user to one or more social media pages of a second user. The links may connect the first user to other webpages, video, audio, or any suitable content that may be linked to a webpage.

When the first user scans the label, methods may include determining which of the links included on the target webpage would be of greatest interest to the first user. Methods may include ordering the links associated with the target webpage based on scan event details associated with the scanning of the label. Methods may include computing the order of the links based on one or more relationships linking scan event details and attributes stored in the multi-dimensional matrix.

Methods may include computing the ordering of the links using machine learning algorithms to compute a level interest to the first user for each of the links. A level of interest may be computed based on a profile of the first user. Methods may include ordering the links displayed to the first user on the target webpage. After determining the ordering of links on the target webpage, a landing page may be displayed on a browser of the first user's scanning device. The landing page displayed to the first user may display the links on the target webpage in the order determined based on a user profile associated with the first user. For example, a landing page presented to the user in response to the scan may display links of the target webpage that are determined to be of greatest interest to the first user on top of the landing page.

For example, a landing page presented to the user in response to the scan may display links of the target webpage that are determined to be of greatest interest to the first user may be displayed on top of the landing page. Links that are determined to be of lesser interest to the first user may be displayed lower on the landing page displayed to the first user. When presented with a landing page that includes the ordered links, methods may include monitoring activity of the first user on the landing page. If the first user accesses a link presented on the landing page that is not the first or uppermost link, methods may include dynamically reordering the links displayed on the landing page.

Methods may include reordering the links on the landing page in response to receiving a second scan of the label or another label that encodes a link to the target webpage. Links displayed to the first user on a landing page may be reordered based on which link the first user accessed in response to an earlier scan that triggered a display of links on the target webpage. The links presented in a landing page may be reordered based on updates (e.g., adding new attributes or updates to previously stored attributes) to the user's profile. The user's profile may be updated in response to the user's selection(s) of link(s) displayed on the landing page. The user's profile may be updated in response to the user's selection(s) of link(s) displayed on the landing page accessed directly by the first user by typing a URL for the target webpage directly into a browser.

The links associated with the target webpage may be reordered on a landing page based on updates to the multi-dimensional matrix storing attributes for two or more users. The multi-dimensional matrix may be updated in response to actions of other users. The actions of the other users may include accessing links on the target webpage.

When a second user scans the label, or another label that encodes a link to the target webpage, methods may include computing an order of links for the second user. The order of links for the second user may be determined based on a profile associated with the second user. The order of links may be displayed to the second user on a landing page presented to the second user within a browser of the second user's scanning device. The order of links presented to the second user may be different from the order of links displayed to the first user.

A user profile may graphically connect the user's offline activity to the user's online activity. A graphical connection linking offline activity to online activity may be termed a Consumer Intent Graph ("CIG"). A CIG may be computed for multiple users. Such a CIG may link offline activity associated with a static label to online activity associated with multiple users. For example, the CIG may include connections linking geographical positions of scanned labels and action taken by user in response to landing pages generated based on scans of the label at the geographic locations.

The CIG may link trackable electronic activity of users in response to scans of a static machine-readable label. The CIG may link trackable electronic activity of users that scan a static machine-readable label. A static label may be positioned at a fixed location or on a specific object (e.g., a bicycle, hat, shirt, car). The CIG may be designed to index and rank content or actions to present to a user in response to a scan of a label. A CIG may include attributes that represent potential actions or content that may be presented to a user.

An intent index score may be computed based on a CIG. The consumer intent index scores may include probabilistic scores that predict a user's likely intent to take a specific action or utilize specific content in response to scanning a label. For example, the intent index score for a specific action may have a range of 0 (unlikely to happen) to 100 (likely to happen).

A unique CIG may be formulated for each user. For example, a proprietor may operate a pizza restaurant in a mall. The proprietor may link two potential offers to a static machine-readable optical label. The first offer may be a "two for one" dine in deal. The second offer may be a "free home delivery." The proprietor may position copies of the static label at different locations throughout the mall.

A first user may be in the mall at 11:51 am (e.g., lunchtime). The first user may scan a static label displayed at a location in the mall within a threshold distance of the pizza restaurant operated by the proprietor. The scanning of the label may submit a URL encoded in the scanned label to a redirect service. The redirect service may be an application resident on the mobile device of the first user used to scan the label. The redirect service may be a cloud-based application hosted on a remote computer server.

In addition to a redirect URL encoded in the scanned label, the scanning device may also transmit scan event details to the redirect service. Illustrative scan event details may include a scan time (e.g., 11:51 am) a scan location (e.g., specific location in the mall) scanning device (e.g., media access control ("MAC") address of the scanning device). In response to receiving the redirect URL encoded in the scanned label, the redirect service may formulate content, or an action associated with the redirect URL for the given set of scan event details.

In the above example, the redirect service may determine the first user has a consumer intent index score of 93/100 (relatively high) with respect to taking action regarding the available first offer for a "dine-in pizza" offer associated with the scanned label. The redirect service may determine the first user has a consumer intent index score of 21/100 with respect to taking action regarding the available second offer for "deliver pizza."

An exemplary redirect service may utilize a user profile associated with the first user to determine which offer associated with a scanned label to present to the first user. The redirect service may utilize scan event details and the user profile to determine which offer associated with a scanned label to present to the first user. Scan event details may be captured by a cookie resident on the first user's browser. Scan event details may be captured by a pixel resident on a webpage visited by the first user. Scan event details captured by a cookie or pixel may be stored on the first user's mobile device. Scan event details captured by a cookie or pixel may be stored within the user's profile or generally in, a multi-dimensional matrix.

Scan event details may include a unique identifier associated with the first user. The unique identifier may link the first user's mobile device to the first user's profile. Scan event details may include scan time, scan location, weather (gathered from external sources or the consumer's mobile device).

The redirect service may apply a refactoring algorithm to the user profile and scan event details to formulate an action or content to present to the first user. The refactoring algorithm may employ machine learning or other forms of artificial intelligence to determine actions/content to present to the first user. Illustrative machine learning techniques that may be employed by the refactoring algorithm of the redirect service include AdaBoost, Naive Bayes, Support Vector Machine, Random Forests, Artificial Neural Networks, Deep Neural Networks and Convolutional Neural Networks.

Based on information encoded in the scanned label, associated scan event details, user profile and other suitable information stored in the multi-dimensional matrix, the refactoring algorithm may compute an intent index score for each potential action/content associated with the scanned label. Based on the intent index score for each potential action/content, the refactoring algorithm may present the action/content having the highest intent index score to the consumer. The refactoring algorithm may present the highest scoring action/content by redirecting the user's browser to a URL of a webpage that presents the highest scoring action/content.

In the aforementioned example, the first user may be presented with the first "two for one" offer because this first offer scored higher (93/100) relative to the second "dine-in pizza" offer associated with the scanned label. The intent index score computed by the refactoring algorithm may be accurate than other digital advertising or internet search index scores.

The highest intent index score computed by the refactoring algorithm indicates the first user is contextually ready to take an action. In the above example, the refactoring algorithm may assign the first "two for one" offer the higher intent index score because the first user is at the mall (location) at lunch time (time), has purchased pizza before (user profile), and has scanned an optical label associated with a pizza restaurant (data encoded in label).

Methods may include providing a redirect service. The redirect service may be accessed using a redirect URL. The redirect URL may be a URL encoded in a scanned label. When scanned, a native label scanning software running on the mobile device may direct a browser on the user's mobile device to a webpage corresponding to the redirect URL. The webpage associated with the redirect URL may be associated with the redirect service. When the redirect service receives a request from the browser to provide content associated with the redirect URL, before providing the content requested by the browser, the redirect service may formulate a target landing page for the user that scanned the label.

The redirect service may utilize a refactoring algorithm to formulate the target landing page based on the user's profile, scan event details, intent index score(s) and a multi-dimensional matrix. The redirect service may generate a URL for the target landing page. The redirect service may direct a browser on the user's mobile device to the target landing page by redirecting the browser to the target landing page URL generated for the target landing page. The redirect service may formulate content/action included in the target landing page using a deep neural network.

The redirect service may track one or more actions of the user on the target landing page. For example, using machine learning algorithms such as a deep neural network and, based on the one or more scan event details, the redirect service may dynamically update the user's profile. Input to the deep neural network may include information culled from the multi-dimensional matrix. The deep neural network may include a long short-term memory ("LSTM") architecture.

Information culled from the multi-dimensional matrix and utilized by the redirect service may be identified based on applying a machine learning algorithm to compute correlations between information stored in the multi-dimensional matrix and a user profile. The information culled from the multi-dimensional matrix may be identified based on applying a machine learning algorithm to compute correlations between information stored in the multi-dimensional matrix and the received scan event details.

A target landing page computed by the redirect service may be one or a plurality of target landing pages. A user profile may be updated based on actions of the user on each of the plurality of target landing pages. In some embodiments, the redirect service may dynamically change the target landing page in response to action of the user on the target landing page. Changing the target landing page may include reordering links or altering content presented on the target landing page. Changing the target landing page may include redirecting the user to a different target landing page.

A target landing page associated with a label may be changed based on performance metrics of the landing page. Performance metrics may include time users spend on a presented landing page and user engagement with content presented on a landing (interaction with a chatbot or add to cart or other activity available on landing page).

Methods may include extracting a geo-physical location embedded in a machine-readable label. The geo-physical location may be a scan event detail. Methods may include determining a target landing page for a user that scans the label based on the extracted location.

An artificial intelligence ("AI") method is provided for providing a user with an interactive customized digital platform on a mobile device. Methods may include receiving, from the user, a first scan of a static machine-readable optical label. The first scan may be captured using a camera of the mobile device. The first scan may be associated with first scan event details. Illustrative first scan event details may include a first time and a first location. The first time may be when the first scan of the label was captured by the user's mobile device. The first location may be a location where the label was scanned by the user.

Methods may include determining, based on (1) a user profile, (2) the first time and (3) the first location, a first landing page URL. Methods may include redirecting a browser on the mobile device to the first landing page URL. The first landing page URL may provide access to content on a first target landing page.

Methods may include receiving, from the user, a second scan of the label. The second scan may be associated with second scan event details. Exemplary second scan event details may include a second time and a second location. The second time may be when the second scan of the label was captured by the user's mobile device. The second location may be a second location where the static machine-readable optical label was scanned by the user.

Methods may include determining, in real-time and based on the user profile, the second time and the second location, a second landing page URL. Methods may include redirecting the browser on the mobile device to a second target landing page, based on the second landing page URL. The content associated with the second target landing page may be different from content associated with the first target landing page. Methods may include utilizing a redirect service to determine the first and the second target landing pages. The redirect service may be run locally on the scanning mobile device. The redirect service may be run at a location remote from the scanning mobile device.

After the first scan, methods may include incorporating the first time, the first location and the first target landing page into the user profile. After the second scan, methods may include incorporating the second time, the second location and the second target landing page into the user profile.

The scanned label may be a first static machine-readable optical label. Methods may include receiving, from the user, a scan of a second static machine-readable optical label. The second label may encode the same information as the first label. The second label may encode information that is different from information encoded in the first label. Based on the user profile, methods may include determining, in real-time and in response to the scan of the second label, a third landing page URL. Based on the third landing page URL, methods may include redirecting the browser on the user's mobile device to a third target landing page. The third landing page may include content computing based on the scan event details associated with the scan of the second label.

Real time may be defined as ≤100 milliseconds from a time the label is scanned using the camera of the user's mobile device. Delaying redirecting of the user to a target landing page for longer than 100 milliseconds after scanning may cause a delay noticeable by a human user. To minimize latency, the redirect service may utilize cloud computing services to process received scans at an edge node closest geographically to the scanning mobile device.

Methods may include receiving, from the user, a third scan of the label. For example, the user may scan the first label two or more times. Methods may include redirecting the browser on the user's mobile device to the third target landing page in response to the third scan of the first label. For example, based on the scan event details associated with the third scan, the redirect service may determine that content associated with the third target landing page would maximize utility to the user over any content that may be associated with the URL encoded in the scanned label.

An artificial intelligence ("AI") method for dynamically redirecting a plurality of scans of a machine-readable optical label to different landing pages is provided. The machine-readable label may be a static label. Methods may include receiving a first scan of a static label. The first scan may be received from a first mobile device.

In response to receiving the first scan, methods may include generating content for a first target landing page. The content for the first target landing page may be generated by a redirect service. The redirect service may generate the content in real-time from a time a scanning device captured the first scan. Generating the content may include reordering links on a target landing page. Generating the content may include computing an intent index score for content associated with the scanned static label.

Real-time may be defined as ≤100 milliseconds from a time the first scan was captured by a scanning device. A computational delay by the redirect service of longer than 100 milliseconds may be noticeable by a user of the scanning device. The user may notice a delay of >100 milliseconds while waiting for display of content after scanning the static label.

Methods may include generating a first target landing page URL. The first target landing page URL may provide a link to the target landing page generated by the redirect service. Methods may include redirecting a browser of the first mobile device to a first target landing page corresponding to the first target landing page URL.

Methods may include receiving, from a second mobile device, a second scan of the static label. The second scan may be received by the redirect service. The static label scanned by the second mobile device may be the same static label scanned by the first mobile device. The static label scanned by the second mobile device may encode the same information as the static label scanned by the first mobile device.

In response to receiving the second scan, methods may include generating content for a second target landing page. The content for the second target landing page may be generated by the redirect service. The redirect service may generate the content in real-time from a time the second mobile device captured the second scan of the static label.

Generating the content in response to a scan may include reordering links on a target landing page. Generating the content in response to the second scan may include computing an intent index score for content associated with the static label scanned by the second mobile device. In response to the second scan, methods may include generating a second target landing page URL. Methods may include redirecting a browser of the second mobile device to a second target landing page corresponding to the second target landing page URL. The second target landing page may present content generated by the redirect service in response to receiving the second scan.

The first target landing page generated in response to the first scan may include content that is different from content generated in response to the second scan. For example, the first target landing page may correspond to a social media profile and the second target landing page may correspond to a virtual reality construct. In some embodiments, the first target landing page may be identical to the second target landing page. For example, the redirect service may determine that a first user profile associated with the first mobile device shares at least one attribute with a second user profile associated with the second mobile device.

The first scan may be associated with a first set of scan event details. The first set of first scan event details may include identity the first mobile device, identity of a first user of the first mobile device, a time the first scan was captured by the first mobile device, a location of the first mobile device at the time of the first scan and/or a location of the label scanned by the first mobile device. The redirect service may compute one or more relationships between the first set of scan event details and information stored in the multi-dimensional matrix to generate content in response to the first scan.

The second scan may be associated with a second set of scan event details. The second set of scan event details may include identity the second mobile device, identity of a second user of the second mobile device, a time the second scan was captured by the second mobile device, a location of the second mobile device at the time of the second scan and/or a location of the label scanned by the second mobile device. The redirect service may compute one or more relationships between the second set of scan event details and information stored in the multi-dimensional matrix to generate content in response to the second scan.

Methods may include receiving a third scan of the static label captured by the first mobile device at a second time. The third scan may be received by the redirect service. Methods may include generating, in real-time, the second target landing page URL in response to receiving the third scan. Methods may include transmitting the second target landing page URL to the first mobile device in response to receiving the third scan and thereby redirecting the browser of the first mobile device to the second target landing page. When the first mobile device captures the third scan at the second time, the redirect service may determine that the second target landing page (also provided to the second mobile device) includes content most relevant to the user of the first mobile device.

In response to receiving the first scan from the first mobile device, methods may include applying the redirect service to dynamically update a user profile associated with the first mobile device. The redirect service may update the user profile based on input received from the browser on the first mobile device after the browser is redirected to the first target landing page.

For example, methods may include generating a tracking pixel. The tracking pixel may be embedded in the first target landing page. The tracking pixel may be embedded in the first target landing page before the first user is redirected to the first target landing page. The tracking pixel may capture activity of the first user on the first target landing page. Methods may include dynamically updating the user profile based on information captured by the tracking pixel and transmitted to the redirect service.

Methods may include updating a user profile based on a location of the first mobile device at the time the first scan is captured by the first mobile device. Methods may include updating the user profile based on a location of the first mobile device after redirecting the browser on the first mobile device to the first target landing page. Methods may include updating the user profile based on a browsing history stored in the browser on the first mobile device.

An artificial intelligence ("AI") redirect system for dynamically generating a customized landing page is provided. The redirect system may dynamically generate a customized landing page in response to receiving a scan of a machine-readable label. The machine-readable label may be a static label. The redirect system may include a processor and a non-transitory memory with instructions stored thereon. The instructions, when executed by the processor, may cause the processor to redirect a mobile device to target content formulated in response to receiving the scan of the static label. The redirect system may be resident as an application on a mobile device.

The redirect system may capture a scan of the static label. The redirect system may extract a default Uniform Resource Locator ("URL"), or other information encoded in the scanned static label. The redirect system may transfer the default URL to a redirect service. The redirect system may transfer one or more scan event details to the redirect service.

The redirect system may receive a redirect URL formulated by the redirect service. The redirect system may load a target landing page corresponding to the redirect URL. The redirect system may load the target landing page on the mobile device that scanned the static label within ≤100 milliseconds from capturing a scan of the static label. The redirect system may load a default webpage on the mobile device when a redirect URL is not received by the mobile device within 100 milliseconds of scanning the static label. The default webpage may include content accessible via the default URL encoded in the scanned static label.

The redirect system may track activity of a user on the target landing page. The redirect system may track the activity based on capturing inputs of the user received by the mobile device. The redirect system may transmit the tracked activity to the redirect service. The target landing page may be a first target landing page. The redirect system may load a second target landing page on the mobile device based on the tracked activity on the first landing page. Based on the tracked activity, the redirect service may dynamically update, an intent index score, user profile and/or a multi-dimensional matrix associated. If activity of the user on the target landing page is below a threshold, the redirect system may redirect another user that scans the static label to a different landing page.

An artificial intelligence ("AI") redirect system for dynamically generating a customized landing page is provided. The redirect system may generate a customized landing page in response to a scan of a machine-readable label. The machine-readable label may be a static label. The redirect system may include a processor and a non-transitory memory with instructions stored thereon. The instructions when executed by the processor, cause the processor to redirect a mobile device to target content formulated in response to the scan of the static label. The redirect system may be hosted on a computer system remote from a device that captures the scan of the static label.

The redirect system may receive a default URL. The default URL may be extracted from a first scan of the static label. The redirect system may receive a first set of scan event details associated with the first scan. The redirect system may generate a first redirect URL for the first scan based on the first set of scan event details. In response to the first scan, the redirect system may trigger loading of first content linked to the first redirect URL. The first content may be loaded using a browser on mobile device that performed the first scan.

The redirect system may receive the default URL extracted from a second scan of the static label. The redirect system may receive a second set of scan event details associated with the second scan of the static label. The redirect system may generate a second redirect URL for the second scan based on the second set of scan event details. The redirect system may trigger loading of second content linked to the second redirect URL in response to the second scan. The second content may be loaded using a browser on mobile device that performed the second scan.

The redirect system may receive the first scan from a first mobile device. The redirect system may trigger the loading of the first content on the first mobile device. The redirect system may receive the second scan from a second mobile device. The redirect system may trigger the loading of the second content on the second mobile device.

The first content may be different from the second content. The first content may be customized for the user of a first mobile device based on one or more first scan event details captured by the first mobile device. The first content may be customized for a first user of the first mobile device based a user profile of the first user. The second content may be customized based on one or more second scan event details captured by a second mobile device. The second content may be customized for a second user of the second mobile device based a user profile of the second user. The second content linked to the second redirect URL may include a reordering of links presented in the first content linked to the first redirect URL.

In response to receiving the first scan, the redirect system may transmit tracking code, such as tracking pixel or cookie, to a mobile device that captured the first scan. The redirect system may generate an intent index score based and/or update a CIG on the first (historical) and second (current) sets of scan event details. The intent index score and/or CIG may be updated based on a third set of scan event details captured by the tracking code embedded in the target page generated based on the first and second sets of scan event details. Illustrative tracking code may implement Federated Learning of Cohorts or other tracking methods that group users based on common activity associated with each of the users.

The redirect system may receive a third scan of a second static label. In response to receiving the third scan, the redirect system may generate a customized landing page for the mobile device in response to the third scan. The redirect system may generate the customized landing page in response to the third scan based on the intent index score and/or CIG. The redirect system may generate a third redirect URL for the customized landing page. The redirect system may trigger loading of the customized landing page by transmitting the third redirect URL to the mobile device that captured the third scan.

Apparatus may include a software application. The software application may be run on a mobile device. The software application may be used to activate a machine-readable label scanned by the mobile device.

An illustrative activation process may begin when the mobile device is used to scan a label. The label may be associated with an activation code. The activation code may be presented in packaging associated with the label. For example, the label may be printed on a sticker. The packaging of the sticker may include the activation code.

The software application may detect that the label has been scanned by the mobile device. The software application may submit information encoded in the label to a redirect service. The redirect service may detect that the label has been scanned for the first time. The redirect service may detect that the label is currently inactive. An inactive label may not be associated with content other than content at a default URL encoded in the label. The redirect service may detect that the label has not yet been linked to one or more target landing pages.

The redirect service may provide instructions to the software application that prompts the user of the mobile device to enter the activation code packaged with the label. The redirect service may determine that the label has not been activated and provide instructions to the software application in real-time. Real time may be defined as ≤100 milliseconds from a time the mobile device scanned the label. A delay of greater than 100 milliseconds after scanning the label may be noticeable by a human user.

The software application may also capture scan event details. For example, the software application may detect a scan location based on a GPS location of the scanning mobile device, signal triangulation associated with the scanning mobile device, or latitude/longitude coordinates detected by the mobile device. The software application may map a detected location to a particular street address. As part of the activation process, the software application may prompt the user to confirm the detected street address.

The software application may prompt the user to confirm a placement location of the label. The software application may prompt the user for additional address details such as a floor or suite number. The software application may prompt the user to capture a picture of the label affixed to the placement location. The placement location may be a moveable object such as a bicycle, car, shirt or hat. The placement location may be a virtual location such as within a video stream, within a content of a TV show, on an electronic billboard, within AR content, VR content or other forms of electronic media. The software application may submit the user inputs associated with label placement to the redirect service.

The redirect service may save the inputs received from the user in the multi-dimensional matrix. The redirect service may determine content to associate with the scanned label. The redirect service may determine content to associate with the label based on scan event details captured during activation of the label. The redirect service may determine content to associate with the label based on inputs received from the user during activation of the label. The redirect service may determine content to associate with the label based on applying one or more machine learning algorithms to the multi-dimensional matrix.

After activation, subsequent scans of the label may be redirected, by the redirect service, to the content associated with the label. After activation, the redirect service may dynamically determine content to display in response to a scan of the label by a mobile device.

The redirect service may be utilized to reprogram a static label. An exemplary static label may be a printed label affixed to a tangible medium. For example, a static label may be printed on a physical card or affixed to real property. The redirect service may reprogram the static label such that the static label is only active when scanned inside a pre-defined geofenced area.

For example, a static label printed on promotional materials distributed at a convention may link to first content for a duration of the convention when scanning within a location (e.g., building) where the convention is being held. After a conclusion of the conference, a scan of the static label may link to information about an upcoming event or information about the conference organizer or sponsor.

Within the convention location, the static label may link to different content depending on where the static label is scanned. When a user scans the static label in a cafeteria, a menu may be displayed. The displayed menu may be dependent on a time the label is scanned. For example, a lunch menu may be displayed in response to a scan captured between 11 am and 3 pm. A dinner menu may be displayed in response to a scan captured between 4 pm and 9 pm. When a user scans the static label in a conference room, a schedule or agenda associated with an upcoming event to be held in that conference room may be displayed in response to the scan.

A static label may be programmed to be associated with any suitable content. A static label affixed to a stadium may be programmed to present content associated with an ongoing event at the stadium. A static label may be programmed to be associated with a target functionality. For example, the static label may be programmed to, in response to a scan, initiate a purchase from a merchant. The static label may be programmed to initiate a purchase limited to a maximum value.

The static label may be programmed to only display content when the label is affixed to a target item, such as on apparel, a car or real property. A target item may include a beacon that broadcasts its location. The scanning device may include a location sensor. Location of the scanning device may be correlated to a location of a scanned label.

Static labels may be preprinted and encoded with fixed information. The redirect service may be utilized to redirect the scanning device to any suitable content. A static label may be reprogrammed by the redirect service to change content associated with the static label. Content associated with a static label may be changed by the redirect service without reprinting the static label to include different encoded information. The redirect service may require an activation process for the static label before redirecting to suitable content. The redirect service may be utilized to redirect a scanning device to any suitable content based on one or more scan event details (e.g., location, time, weather, scanning device) associated with a scan of the static label.

A static label may include an embedded NFC chip. The NFC chip may include functionality for transmitting information encoded on the label to a receiving device. NFC transmissions may have a limited range of about 10 centimeters.

The NFC chip embedded in the label may receive information from a scanning device. The embedded NFC chip may store scan event details. The stored scan event details may be extracted by an instance of the redirect service running on another scanning device that scans the label. The redirect service may formulate content for the other scanning device based on the scan event details stored in the embedded NFC chip.

Information received from the embedded NFC chip may be submitted to a redirect service to determine content associated with the label. A label that includes an embedded NFC chip may present first content to a device that communicates with the device using NFC. The label may present second content to a device that scans the label using a camera.

Methods may include combining "public" information—i.e., information retrieved from a public-facing label—with "private" information—i.e., information derived from a scanning device (and/or scanner user). Such a combination of information may determine one or more actions taken subsequent to a scan. For example, a scan of a label captured by a pre-registered scanning device may be associated with access to special content such as purchase discounts, special offers or information designed for employees. The redirect service may respond to a scan received from a pre-registered scanning device with a target landing page that includes content formulated specially for the pre-registered scanning device or user of the pre-registered scanning device.

A label may be programmed to display specific content when scanned by a pre-registered scanner. For example, a pre-registered scanning device may submit scan event details to the redirect service that includes identifying information about the scanning device itself. Scanner identifying information may include a MAC address or IP address of the scanning device. Based on the received identifying information, the redirect service may confirm that the scanning device is a pre-registered scanning device. The redirect service may provide the pre-registered scanning device with content associated with the scanning label that is not provided to non-registered scanning devices.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method and/or apparatus.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

In some embodiments, a user with a mobile phone may begin an interaction with a label by using the camera on the mobile phone to scan machine-readable optical label 100 illustrated in FIG. 1. Label 100 may encode any suitable information such as a Uniform Resource Locator ("URL"), contact information associated with a business or other alphanumeric information and instructions that trigger the scanning device to perform a target action or function. The information encoded in label 100 may be extracted by a native application or a third-party application running on a scanning device.

Label 100 illustrates an encoded pattern that conforms to an encoding specification for a Quick Response ("QR") code. Machine-readable labels described in connection with this disclosure may be any suitable scannable label. In other examples, the machine-readable label may be a linear barcode or a two-dimensional matrix barcode, e.g., Aztec code, ShotCode, SPARQCode, and the like.

Label 100 may be a "static" machine-readable label. A "static" label may encode a set of instructions that are repeatedly scanned by multiple users and/or mobile devices. Even though label 100 may be static, the particular content that is presented to a user in response to a scan of label 100 is dynamically customized for each user.

Figure 2:
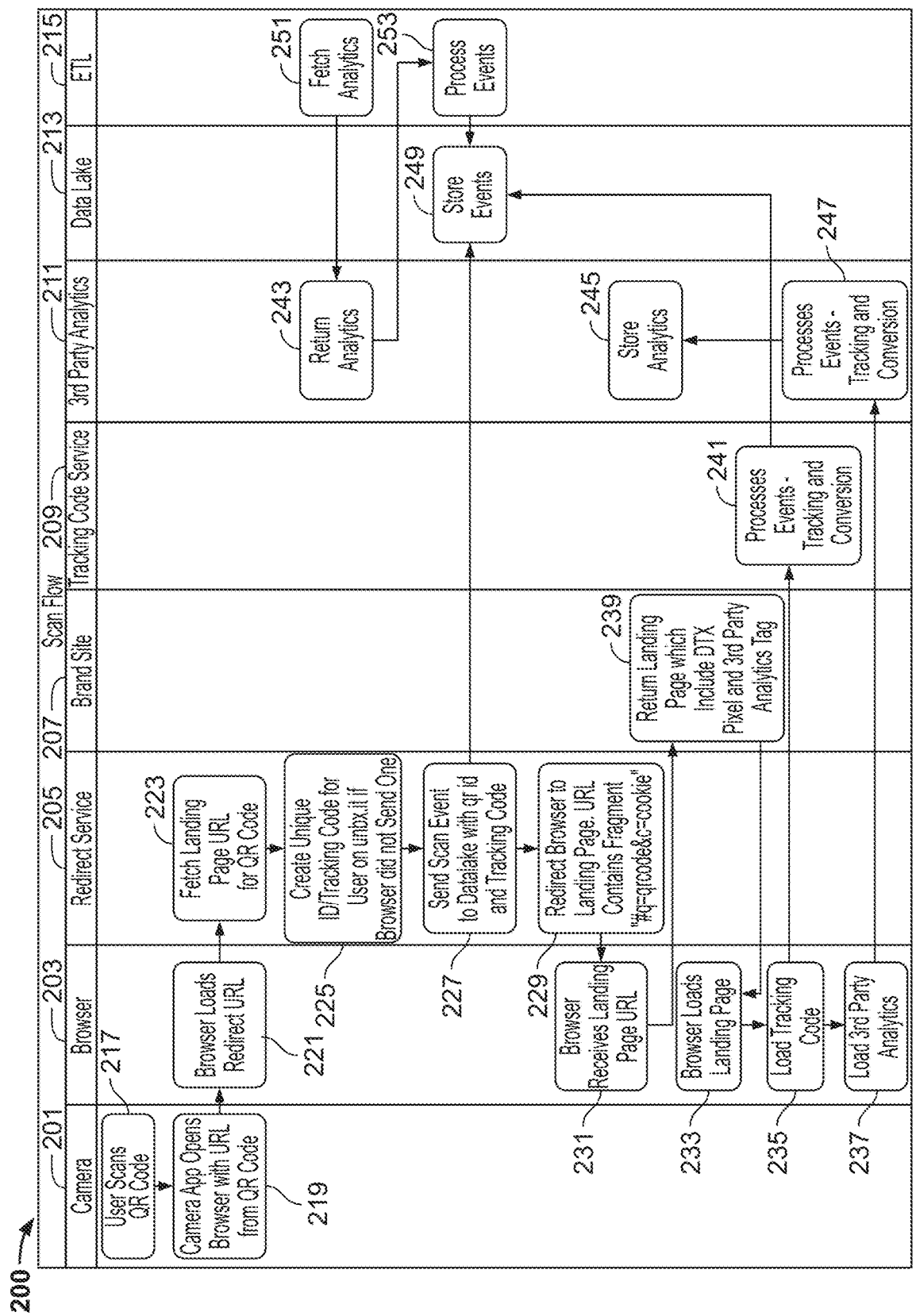
FIG. 2 shows an illustrative system and process in accordance with principles of the disclosure.

FIG. 2 is a flowchart of exemplary process 200 for generating interactive customized content in response to a scan of a static label. Process 200 starts at step 217 when a user scans a machine-readable label such as label 100 (shown in FIG. 1) using camera 201. This is referred to as a "scan event" in the present disclosure.

After the mobile phone recognizes the scanned label, it opens browser 203 using a URL encoded in the label. For example, a URL encoded in the label may be a shortened URL (e.g., based on a URL shortening service like Bitly). The URL encoded in the label is a redirect URL, and at step 221, it is loaded by browser 203. At step 223, redirect service 205 retrieves a landing page URL for the scanned label. If a unique cookie or other identifier does not exist for the user (or was sent by the browser), at step 225, tracking code, such as a cookie or pixel is generated. At step 227, scan event details and the tracking code (which may be configured to track user browsing and online purchasing histories) are transmitted to a back-end database (e.g., data lake 213 that stores data in its raw or native format) for analysis. The back-end database may store information received from redirect service 205 in a multi-dimensional matrix.

A landing page URL, which corresponds to target content generated for the user in connection with scan event 217 is then computed by redirect service 205. At step 229, redirect service 205 transmits the landing page URL to browser 203, thereby redirecting browser 203 to the target content. In some embodiments, the landing page URL is determined based on user preferences, CIG, intent index scores, demographics, user profile or other data stored in the multi-dimensional matrix. At step 231, browser 203 receives the landing page URL and loads a target landing page target that includes content generated by redirect service 205 for the user.

Redirect service 205 may interact with brand site 207. To customize content in response to a scan event, redirect service 205 may pull content from brand site 207. Brand site 207 may be linked within a multi-dimensional matrix to a redirect URL encoded in a scanned label. Step 239 shows that redirect service 205 may direct browser 203 to a target landing page that is hosted by brand site 207. Step 239 shows that redirect service 205 may direct browser 203 to a target landing page that includes tracking code for capturing user actions on the target landing page.

At step 233, browser 203 loads a target landing page corresponding to the landing page URL provided by redirect service 205. Redirect service 205 may transmit tracking code, such as a tracking pixel or cookie to browser 203. Step 235 shows that when browser 203 loads the target landing page, a pixel may be embedded in the target landing page. Step 237 shows redirect service 205 may commission third-party analytics 211. Third-party analytics 211 may also be used to track user activity on the target landing page or other webpages. Third-party analytics 211 may also be used to evaluate user activity on the target landing page or other webpages.

Step 241 shows that tracking code service 209 may receive tracking data from the tracking code embedded in the target landing page presented in browser 203. Tracking code service 209 may be a subsystem of redirect service 205. At step 249, tracking data received at step 241 may be stored in data lake 213. Tracking data received at step 241 may be stored in a multi-dimensional matrix within data lake 213. Tracking data received at step 241 and stored in data lake 213 may be utilized by redirect service 205 to formulate content in response to a future scan event.

At step 243, processing results of third-party analytics 211 are generated. At step 253, ETL ("Extract, Transform and Load") service 215 loads the processing results of third-party analytics 211 into data lake 213. ETL service 215 may collect data from various sources and integrate the collected data into a single, centralized location (e.g., data lake 213). At steps 251 and 253, ETL service 215 collects processing results of third-party analytics 211 or data from any other source and integrates the collected data into data lake 213. Information integrated into data lake 213 by ETL service 215 may be utilized by redirect service 205 to formulate content in response to a scan event.

At step 247, data captured by third-party analytics 211 may be processed. Processing data captured by third party analytics 211 may include determining a level of engagement and interaction with content generated by redirect service 205 in response to a scan event. Third-party analytics 211 may determine whether user engagement or interaction with the content generated by redirect service 205 has exceeded a threshold level. At step 245, processing results of third-party analytics 211 is stored. The processing results may be stored in data lake 213.

In some embodiments, the steps from the scan event to browser 203 loading a target landing page for the user can be represented as follows:

1. Request made to https://unbx.it/:qr_id
2. Collect qr_id (or other user or scanning device identifying information)
3. Look for tacking code (e.g., cookie)
   a. If there save and use to reset the tracking code with new TTL
   b. If not, generate uid and use for tracking code
4. Look up qr_id in redirect service to get target landing page
5. Set tracking code in response
6. Send tracking code, qr_id and http request information to data lake for analysis
7. Redirect user to target landing page Operation (1) includes extracting a URL from a scanned label. The URL encoded in the scanned label is a redirect URL, which can be a shortened URL. Operation (1) further includes launching, based on the redirect URL, a redirect service that is used to determine a target landing page for the use. The target landing page may be determined based on a qr_id field, which uniquely identifies a user or scanning device. The qr_id field may be a MAC address of the scanning device or a biometric feature of the user.

Operation (2) includes retrieving the qr_id field from the redirect service. Operation (3) includes determining whether a tracking code for the user associated with the (unique identifier uid) and the scanned label exists. If the tracking code exists, its time-to-live ("TTL") field is reset since it has just been accessed. If the tracking code does not exist, it is generated along with a pseudo-randomly generated universally unique identifier (uid) used in connection with the tracking code.

Operation (4) includes accessing a redirect service (redis) using the qr_id to retrieve, for example, the URL of a target landing page. For example, the redirect service may include an in-memory key-value database that can be configured to store a variety of different data structures. Thus, the qr_id can be used to retrieve other information (e.g., special offers that have been curated for the user, other landing page suggestions) in addition to a target landing page.

Operation (5) includes updating the tracking code based on the information retrieved in (4). Operation (6) includes sending the updated tracking code and retrieved information to a third-party analytic service in order to update the underlying machine learning models for generating content for the user or the scanned label. Operation (7) redirects the user to a target landing page generated by the redirect service. The process of the user scanning a label with a mobile phone camera (the scan event) and interacting with the presented target landing page, with the corresponding timestamps, may be referred to herein as a "touchpoint."

In some embodiments, third-party web analytic services 211 can be incorporated into the process of providing a target landing page in response to a scan event. Third-party analytic services (e.g., Google Analytics, Federated Learning of Cohorts) may provide measurement, collection, analysis and reporting of web traffic, and generate key performance indicators ("KPI") that can be used to determine content that would be best suited to maximize user interaction time with the content generated in response to a scan event. Previous and ongoing user interactions can be used to inform content generated in response to future scan events.

Figure 3:
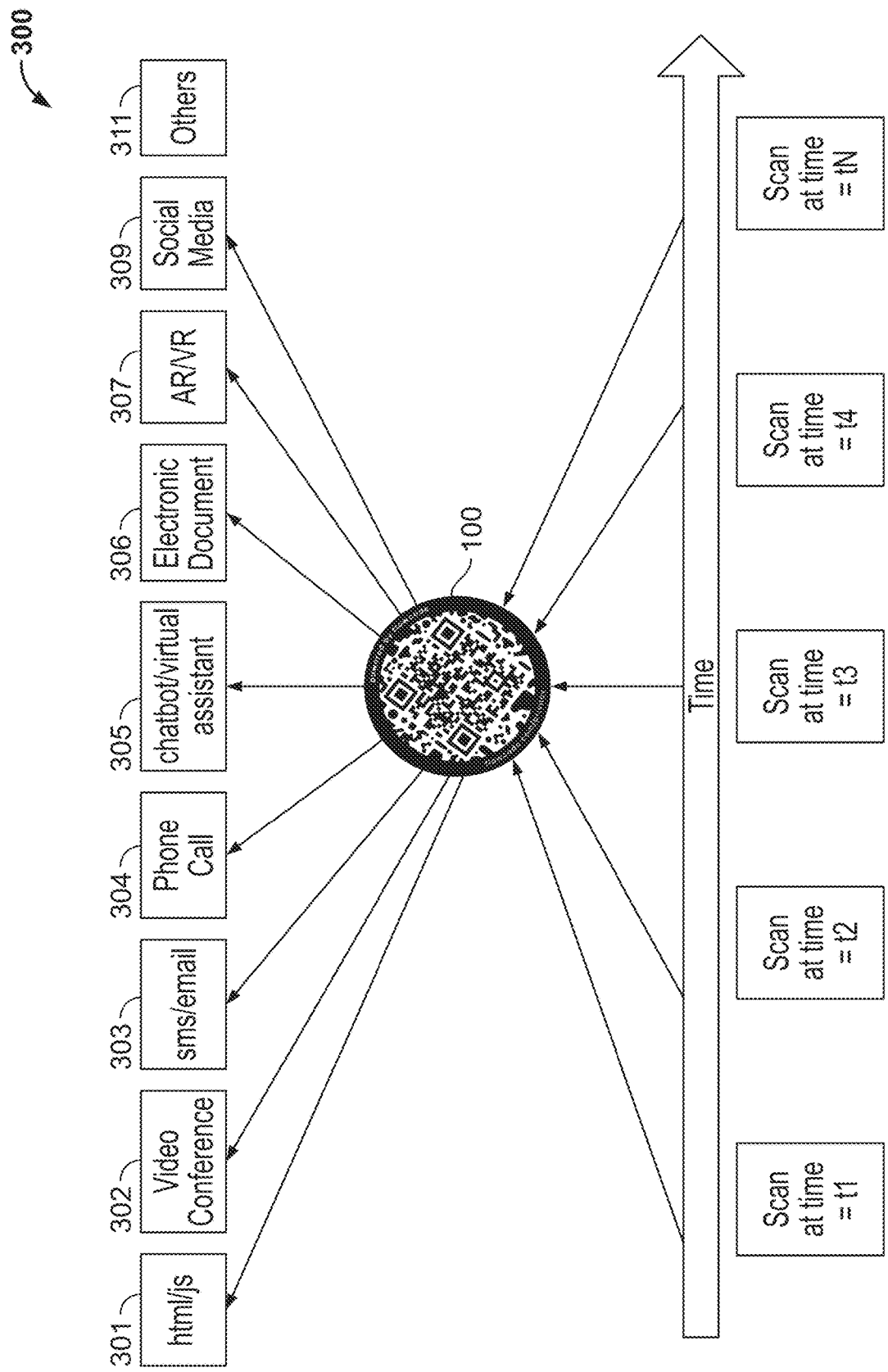
FIG. 3 shows an illustrative system and process in accordance with principles of the disclosure.

FIG. 3 illustrates exemplary content and services that may be presented by a redirect service in response to a scan event. FIG. 3 illustrates that different content and services may be presented in response to a scan of a static label (e.g., label 100) at different times by a single user. In the context of FIG. 3, the processes described in FIG. 2 may be performed on behalf of the same user at each of scan times $t_1$, $t_2$, $t_3$, $t_4$, ..., $t_N$ to obtain customized content in response to each scan. Each of these scan times is a touchpoint that includes a user interacting with the content computed by a redirect service in response to a scan event.

The content generated by the redirect service at $t_2$ may be based on user interactions with content presented at $t_1$. The content generated by the redirect service at $t_3$ may be based on user interactions with content presented at $t_1$ and user interactions with content presented at $t_2$. More generally, content generated by the redirect service at $t_i$ may be based on user interactions with content presented at $t_{i-1}$, $t_{i-2}$, $t_{i-3}$ ... $t_{i-N}$. User interactions with presented content may be obtained from tracking code embedded in presented content, tracking code resident on a scanning device or third-party tracking and analytics.

As illustrated in FIG. 3, the different content and services may be presented to the user via a target landing page (e.g., as performed in operation (7) described above). Illustrative content and services include presenting webpage 301 (e.g., created with HTML or JavaScript), initiating video conference services 302, initiating SMS or email services 303, initiating telephony services 304, initiating chatbot or virtual assistant services 305, provisioning access to electronic document(s) 306, presenting virtual reality (VR) or augmented reality (AR) content 307, opening social media portals (e.g., Twitter, Facebook, Snapchat, Instagram, etc.) 309 and initiating other services and/or frameworks 311.

Figure 4:
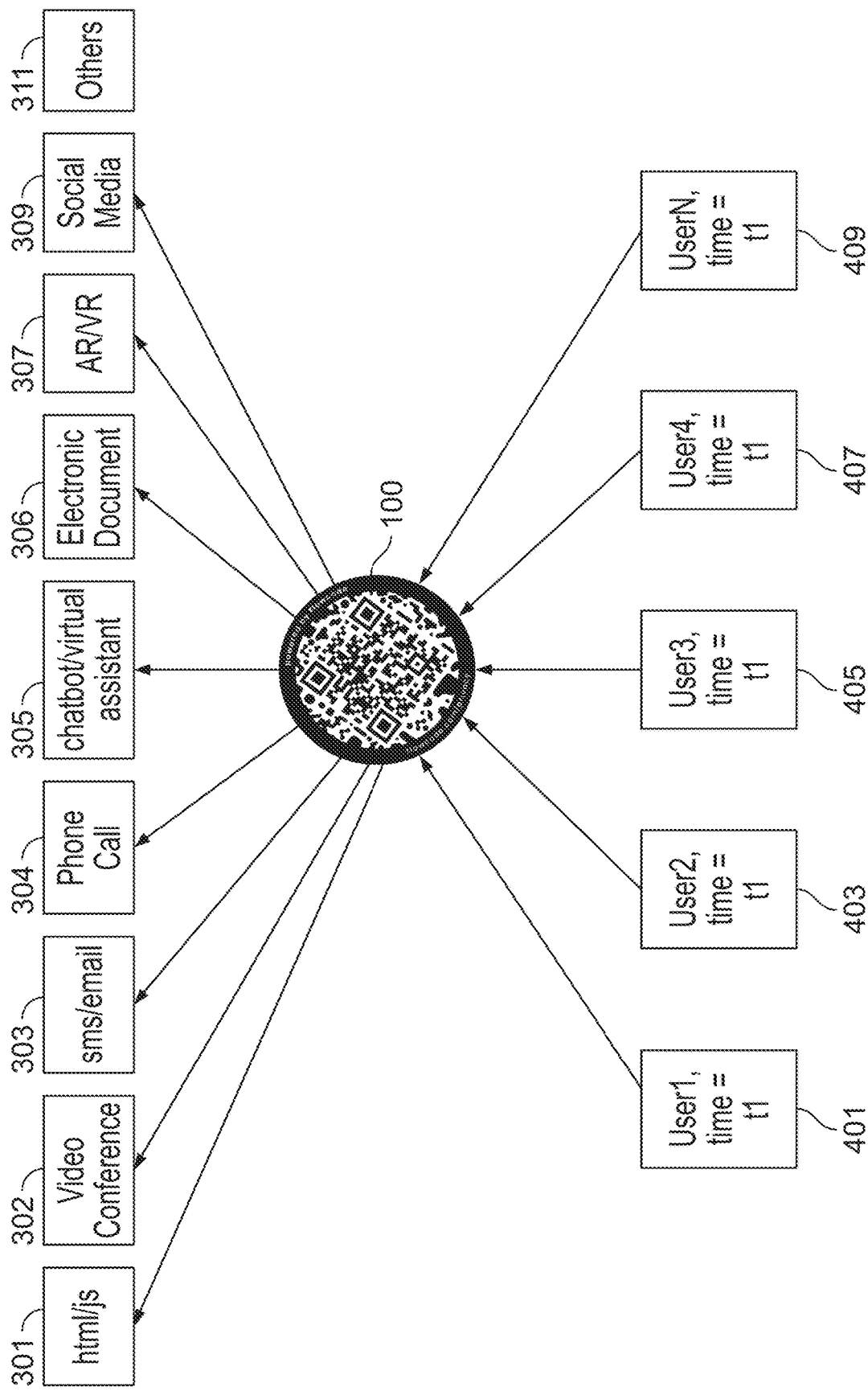
FIG. 4 shows an illustrative system and process in accordance with principles of the disclosure.

FIG. 4 illustrates an example of different content and services that may be presented by a redirect service in response to different users scanning instances of a static label (e.g., label 100) at a single time. FIG. 4 illustrates the process described in FIG. 2 being performed for each of users 401 (User1), 403 (User2), 405 (User3), 407 (User4), 409 (UserN) in response to scanning label 100 at $t_1$. Each scan of label 100 by a different user may be a discrete scan event. Content for each scan event may be formulated by a redirect service based on scan event details associated with the scan event.

As illustrated in FIG. 4, the different content and services that may be presented by a redirect service (e.g., as performed in operation (7) described above) include presenting webpage 301 (e.g., created with HTML or JavaScript), initiating video conference services 302, initiating SMS or email services 303, initiating telephony services 304, initiating chatbot or virtual assistant services 305, provisioning access to electronic document(s) 306, presenting virtual reality (VR) or augmented reality (AR) content 307, opening social media portals (e.g., Twitter, Facebook, Snapchat, Instagram, etc.) 309 and initiating other services and/or frameworks 311.

In FIGS. 3 and 4, specific content and services that may be presented to the user(s) within a target landing page, may be formulated by a redirect service based on a variety of attributes. The variety of attributes may include scan event details associated with each scan event. The variety of attributes may include scan event details associated with previous scan events.

For example, FIG. 3 may include a scenario of a user walking through a department store or mall and scanning labels at different locations and at different times. In response to a scan event at a target location, the redirect service may formulate a landing page that is presented content related to the specific product within a threshold distance of a scanned label. In response to a scan event (e.g., at time $t_4$), the redirect service may present to a user discount for a product based on similar products the user has shown interest in at earlier scan events (e.g., at times $t_1$ and $t_2$).

As further example, in FIG. 4 a subset of users (e.g., User1, User2 and User4) may be located in the same geographic region and may each scan a label to access information about eating out. The redirect service may formulate a landing page for User1 and User4 that incentivizes User1 and User 4 to dine together at the same eatery if the redirect service determines that User1 and User4 know each other (e.g., based on social media feeds). To incentivize User1 and User 4 to dine together at the same eatery, the redirect service may formulate a discount at a nearby target restaurant for both User1 and User 4.

Figure 5:
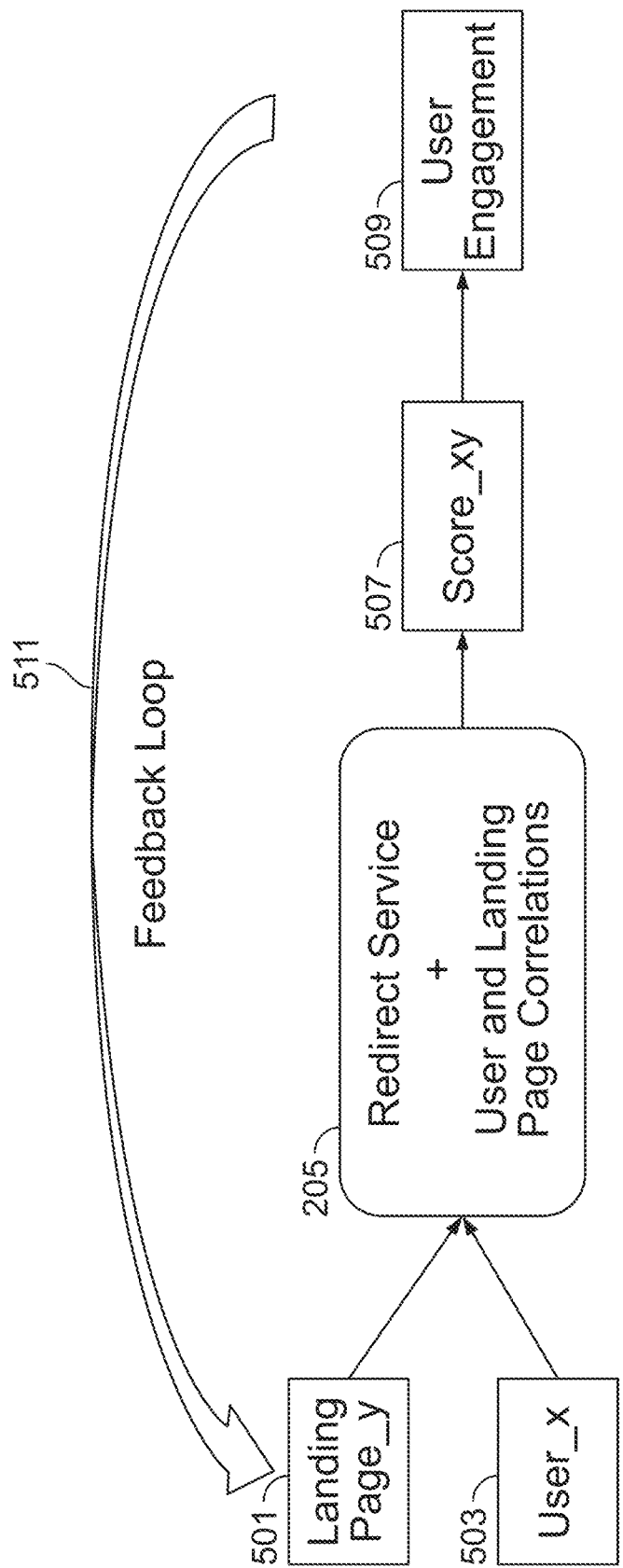
FIG. 5 shows an illustrative system and process in accordance with principles of the disclosure.

FIG. 5 shows illustrative feedback loop 511. Feedback loop 511 may be utilized to dynamically formulate content presented in a target landing page by a redirect service. Feedback loop 511 shows that a redirect service (e.g., utilizing machine learning algorithms) may account for previous scan events and content generated in response to those previous scan events when computing content for a current scan event.

As illustrated in FIG. 5, after a user has interacted with a target landing page, user activity on the landing page (user_x) 503 and landing page information (landing page_y) 501 is input into redirect service 205. Redirect service 205 may update user and landing page correlations and output score 507 (score_xy). Score 507 may represent a level of user engagement of the user with the content on landing page (landing page_y) 501. Score 507 may be an intent index score.

Score 507 may be used by a redirect service to formulate content for landing pages presented to the user in response to future scan events. For example, a landing page may include a plurality of links. Based on links accessed by the user, the links may be reordered the next time the user scans a label that is associated with the plurality of links.

Redirect service 205 may apply one or more machine learning algorithms that provide content recommendations. The machine learning algorithms may provide content-agnostic recommendations. For example, redirect service 205 may extract patterns in scan events, scan event details, user activity on target landing pages or any online or offline user activity to formulate content recommendations. For example, based on scan events or scan event details, redirect service 205 may determine that 90% of users show interest in two items. Redirect service 205 may recommend content associated with the second item to a user who scans a label associated with the first item.

Redirect service 205 may include a user-user framework or an item-item framework. In the former, content recommendations provided to a particular user are based on finding users that similar to that particular user, and then recommending items liked by those similar users. Whereas, in the latter, items that are similar to items liked by the user are found and recommended. User similarity may be determined based on two or more users sharing a threshold number of attributes in each of their user profiles. Item similarity may be determined based on similar users expressing interest in two or more items. Item similarity may be determined based on attributes of the items, such as cost, functionality, availability, manufactures, reseller or any suitable attribute associated with an item.

Thus, redirect service 205 may utilize the user-user framework to suggest particular content to a user based on one more users having engaged with the particular content (e.g., a social media platform is suggested to a user because their user profile shares a threshold number of attributes with social media influencers). Similarly, content can be suggested to a user based on the engagement of that user with other related content (e.g., an AR experience may be loaded for a user that has previously spent a long time engaging with VR frameworks in the case that the brand the user is engaging with does not have a VR framework available).

Embodiments of the disclosed technology employ a user profile (or user persona) that consist of multiple attributes representative of a user. The attributes may include user preferences (e.g., favorite brands, favorite movies or TV shows, etc.), previous purchasing and browsing activity of the user, scan event details and user demographic information (e.g., gender, age, marital status, income, etc.).

The user profile may include a CIG that connects the user's offline activity to the user's online activity. The CIG may link offline scan event details (such a label location, scan location, scan time, weather at scan time, physiological information of the user) to online user activity in response to a scan event. Illustrative online activity may include landing pages presented to the user in response to scan events, online activity on the user on the presented landing pages, previous browsing and purchasing history of the user (e.g., which web sites or online chatrooms has the user frequented in the last 30, 60 or 90 days).

Redirect service 205 correlate attributes, and based on the correlations, determine a target landing page for the user in response to a scan event. Furthermore, the user profile may be dynamically updated based on activity (online or offline) in response to a current scan event (or activity associated with the most recent N scan events). Score 507 may be used to determine utility of content to a user or user profile in response to a scan event. A high score may correspond to content likely having a high level of interest to the user.

In some embodiments, score 507 computed in FIG. 5 is based on a series of individual scores, each of which quantify a correlation between one attribute in the user profile (or user persona) and content or services. Individual scores may be generated more generally for a universe of users based on attributes stored in the multi-dimensional matrix, representing multiple user profiles and different content and services. Score 507 may be generated based on scan event details, such as scan location (e.g., home, office public location), time of scan, weather at time of scan, physiological information of the user (e.g., at the scan time) and/or demographic information associated with the user. Illustrative physiological characteristics may include heart rate, body temperature, body motion, facial expression, speech patterns or biometric features.

Illustrative computational techniques that may be used to implement feedback loop 511 include application of machine learning techniques, such as AdaBoost, Naive Bayes, Support Vector Machine, Random Forests, Artificial Neural Networks and Convolutional Neural Networks.

Figure 6:
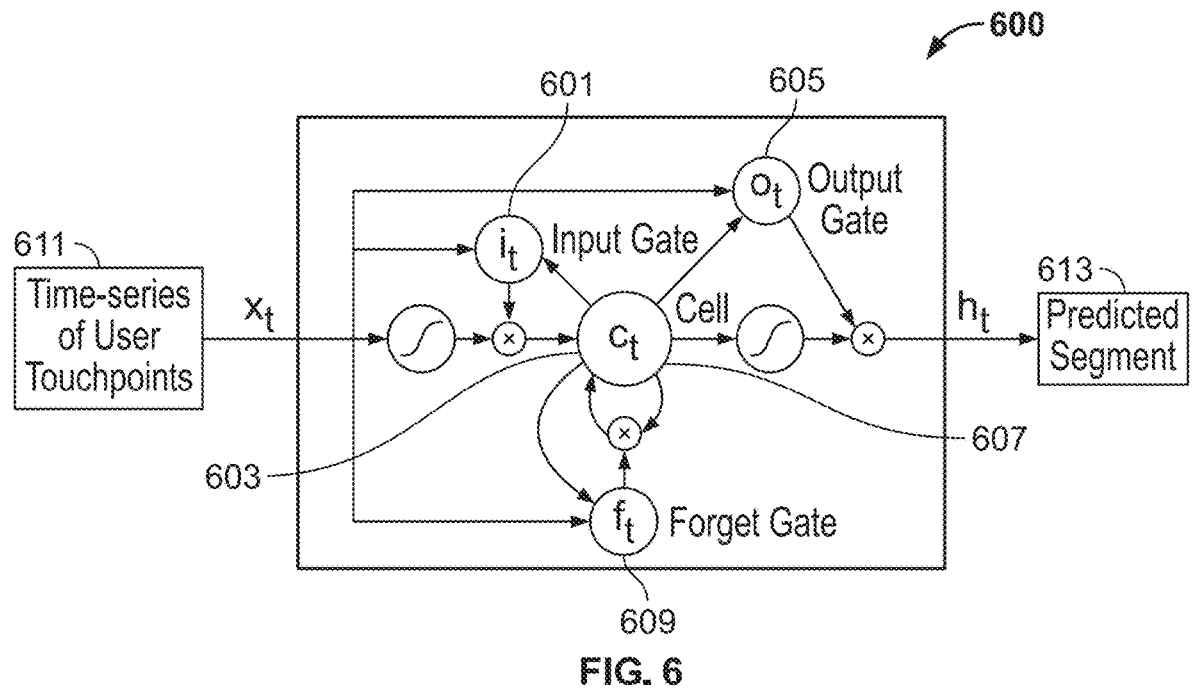
FIG. 6 shows an illustrative system in accordance with principles of the disclosure.

FIG. 6 illustrates an illustrative Long Short-Term Memory ("LSTM") unit 600, which may be utilized by redirect service 205. For example, LSTM unit may be used to construct a deep neural network for implementing feedback loop 511 or otherwise generating content in response to a scan event. Deep neural networks that use an LSTM architecture are well suited to classifying, processing and making predictions based on time series data (e.g., a time-series of "touchpoints"), since there can be lags of unknown duration between events in a time series. As illustrated in FIG. 6, LSTM unit 600 is composed of cell 603, input gate 601, output gate 605 and forget gate 609. LSTM unit 600 generates predicted segment 613 based on input 611. Input 611 may include time-series of user touchpoints.

In the context of FIG. 6, cell 603 is responsible for keeping track of the dependencies between the elements in input sequence 611. Input gate 601 controls the extent to which a new value flows into cell 603. Forget gate 609 controls the extent to which a value remains in cell 603. A forgetting factor associated with forget gate 609 may be used to control the extent to which a value remains in cell 603. The forgetting factor may be updated to account for changes in user browsing and purchasing behaviors. Output gate 605 controls the extent to which the value in cell 603 is used to compute predicted segment 613. Predicted segment 613 may include content formulated in response to a scan event.

In some embodiments, input 611 to the DNN is a series of touchpoints associated with a particular user. The DNN uses input 611 and attributes of a user profile to generate predicted segment 613. Predicted segment 613 may include a target landing page for that user at that time or in response to any combination of scan event details. The DNN is also configured to update a user profile based on predicted segment 613. The DNN may update the user profile using feedback loop 511 shown in FIG. 5.

In some embodiments, a gated recurrent unit ("GRU") (not shown) may be used instead of or in conjunction with LSTM unit 600. More generally, using a GRU, a deep neural network ("DNN") may be configured to operate as a recurrent neural network ("RNN"), in which the connections between nodes form a directed graph along a temporal sequence, and advantageously enables it to exhibit dynamic temporal behavior.

In some embodiments, a transformer model (not shown) may be used instead of or in conjunction with LSTM unit 600 or a GRU. Transformer models utilize context within data to assess the data. As opposed to LSTM units or GRUs, transformer model may process larger quantities of input simultaneously (to extract contextual data).

Figure 7:
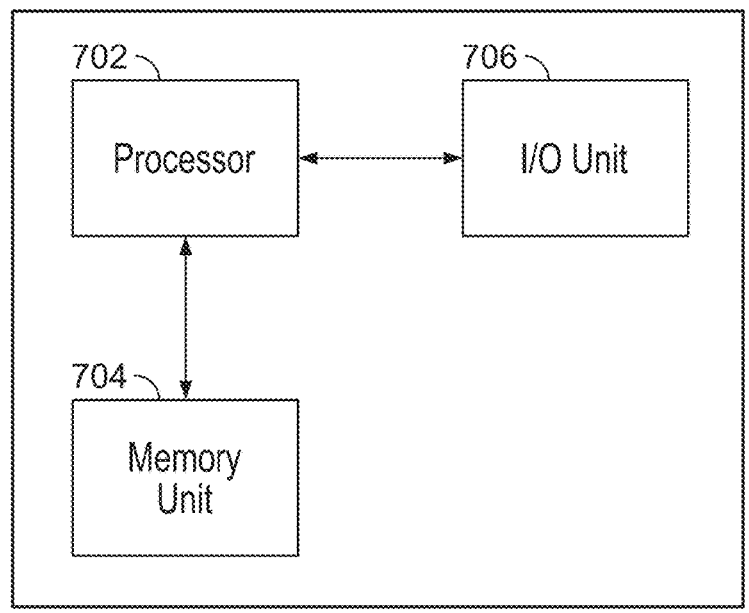
FIG. 7 shows an illustrative system in accordance with principles of the disclosure.

FIG. 7 shows illustrative hardware architecture 700 that may be used to implement apparatus and methods disclosed herein. Hardware architecture 700 includes processor 702. Processor 702 is in communication with memory unit 704 and input/output (I/O) unit 706. Processor 702 may be configured to process data. Memory unit 704 may store and/or buffer the data generated by processor 702. To support various functions of hardware architecture 700, processor 702 may interface with and control (e.g., via the I/O unit 706) operations of other devices.

Processor 702 may include one or more processors, e.g., including but not limited to microprocessors such as a central processing unit ("CPU"), microcontrollers, or the like. Memory unit 704 may include and store processor-executable code, which when executed by processor 702, configures hardware architecture 700 to perform various operations, e.g., such as receiving information, commands, and/or data, processing information and data, and transmitting or providing information/data to another device. Memory unit 704 may store other information and data, such as instructions, software, values, images, and other data processed or referenced by processor 702. For example, memory unit 704 may include Random Access Memory ("RAM"), Read Only Memory ("ROM"), Flash Memory, and other suitable storage media to implement storage functions.

In some implementations, hardware architecture 700 includes input/output unit (I/O) 706 to interface processor 702 and/or memory unit 704 to other modules, units or devices associated with hardware architecture 700, and/or external devices. For example, I/O unit 706 can connect to an external interface, source of data storage, or display device. Various types of wired or wireless interfaces compatible with typical data communication standards, such as Universal Serial Bus ("USB"), IEEE 1394 (FireWire), Bluetooth, Bluetooth low energy ("BLE"), ZigBee, IEEE 802.11, Wireless Local Area Network ("WLAN"), Wireless Personal Area Network ("WPAN"), Wireless Wide Area Network (WWAN), WiMAX, IEEE 802.16 (Worldwide Interoperability for Microwave Access (WiMAX)), 3G/4G/LTE/5G cellular communication methods, and parallel interfaces, can be used to communicate data with the device via I/O unit 706.

For example, hardware architecture 700 may include a wireless communications unit, e.g., such as a transmitter (Tx) or a transmitter/receiver (Tx/Rx) unit. In such implementations, I/O unit 706 can interface processor 702 and memory unit 704 with the wireless communications unit to utilize various types of wireless interfaces, such as the examples described above.

I/O unit 706 can interface with other external interfaces, sources of data storage, and/or visual or audio display devices, etc. to retrieve and transfer data and information that can be processed by processor 702, stored in memory unit 704, or exhibited on an output unit of a user device (e.g., display screen of a computing device) or an external device. I/O unit 706 may include a touchscreen. I/O unit 706 may include a camera.

Figure 8:
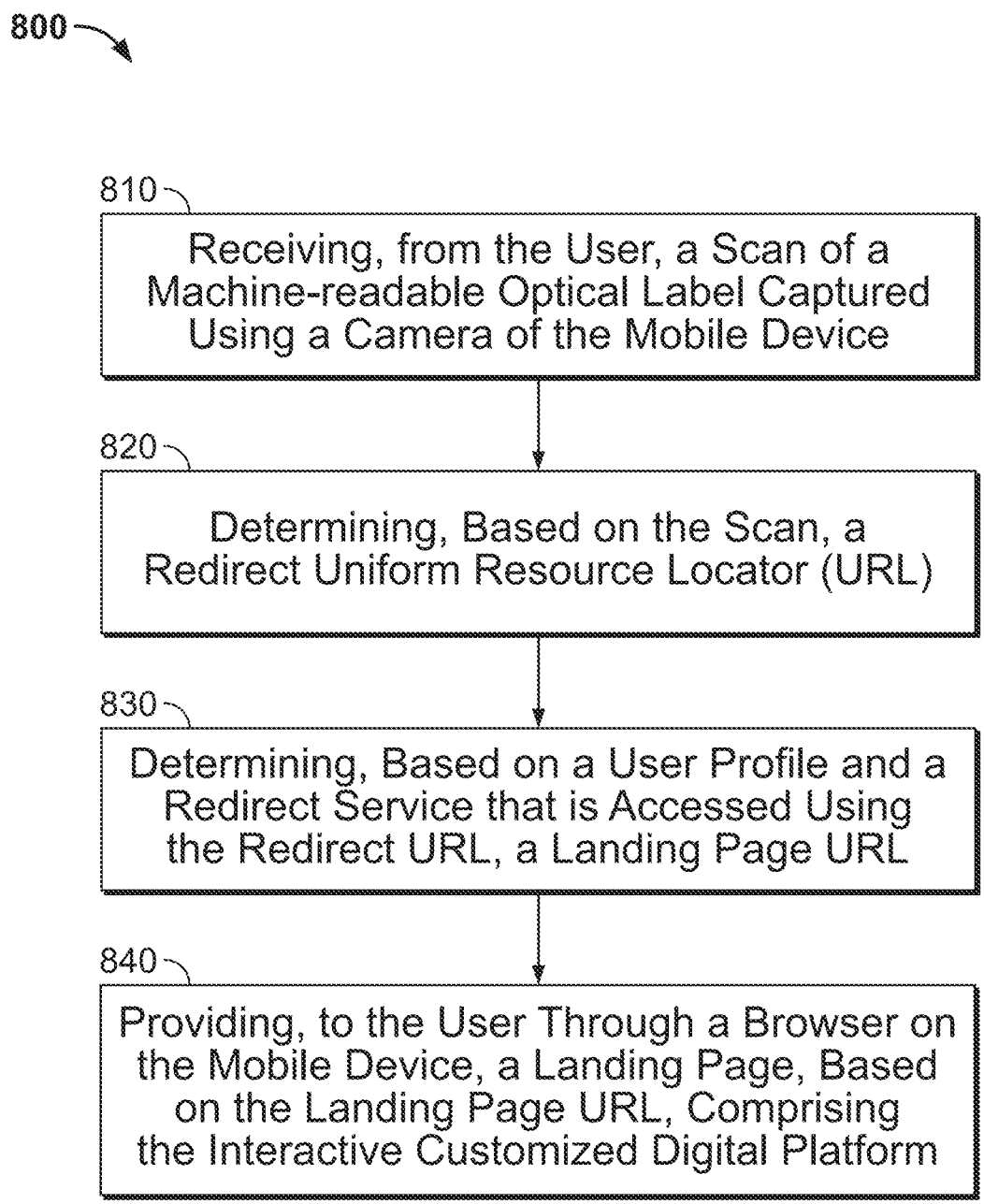
FIG. 8 shows an illustrative process in accordance with principles of the disclosure.

FIG. 8 shows illustrative process 800 for generating customized content in response to a scan event. Process 800 may be performed by systems shown in FIGS. 2 and 5-7. Process 800 includes, at step 810, receiving, from the user, a scan of a machine-readable optical label captured using a camera of a mobile device.

Process 800 includes, at step 820, determining, based on the scan, a redirect Uniform Resource Locator (URL) encoded in the scanned label. Process 800 includes, at step 830, determining, based on a user profile and a redirect service that is accessed using the redirect URL, a landing page URL. Process 800 includes, at step 840, providing, to the user through a browser on the mobile device, a landing page, based on the landing page URL, comprising content customized for the user.

Implementations of the subject matter and the functional operations described in this disclosure may be implemented in various systems, digital electronic circuitry, or in computer software, firmware, or hardware, including the structures disclosed in this disclosure and their structural equivalents, or in combinations of one or more of them. Implementations of the subject matter described in this disclosure can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). In an example, a DNN may be implemented on an ASIC or FPGA.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

Figure 9:
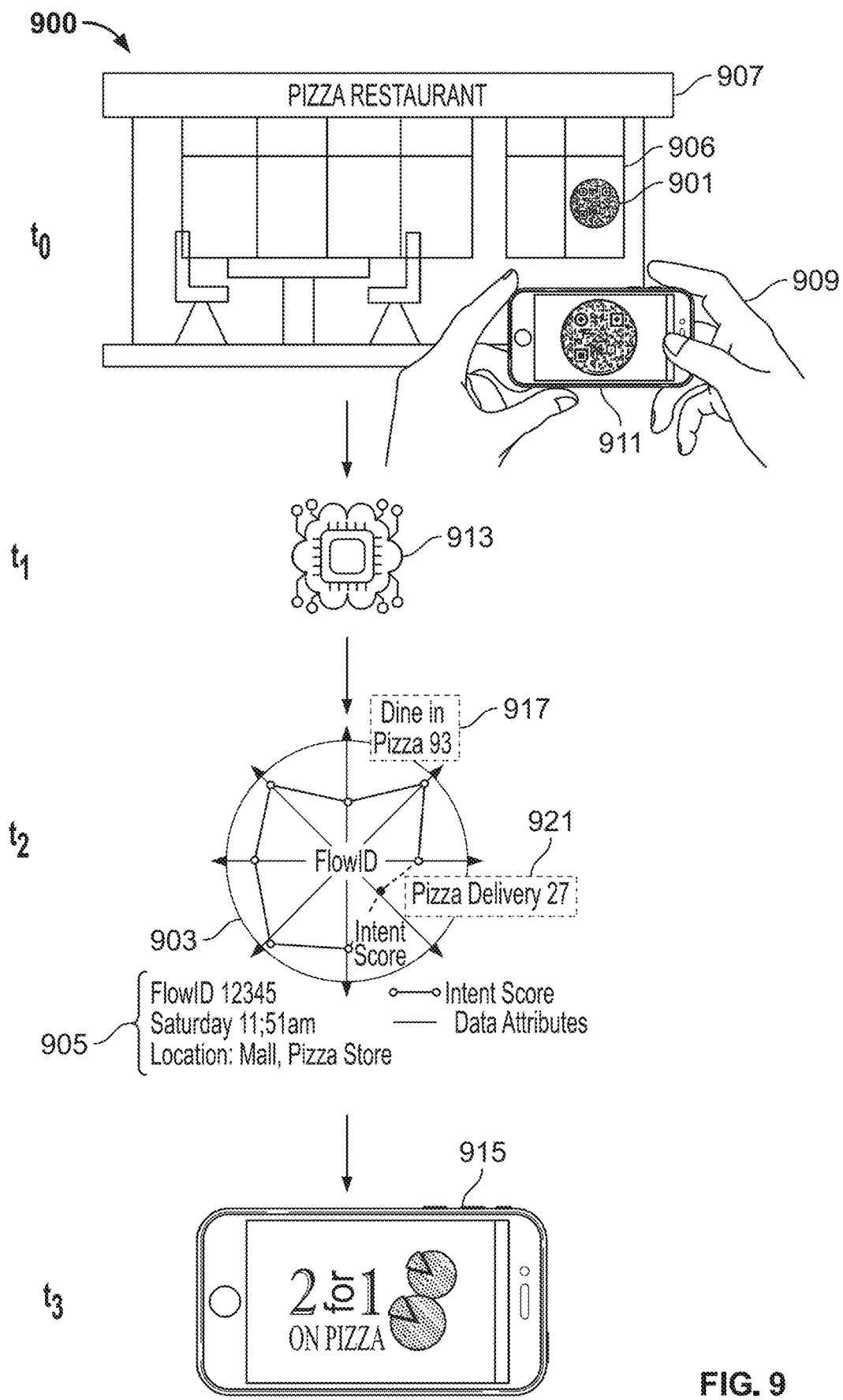
FIG. 9 shows an illustrative system and process in accordance with principles of the disclosure.

FIG. 9 shows illustrative process 900. Process 900 begins at to when user 909 scans label 901 using mobile device 911. Label 901 is positioned in store window 906 of pizza restaurant 907. Label 901 includes an encoded redirect URL. The encoded URL, when scanned by mobile device 911, triggers mobile device 911 to submit the redirect URL to redirect service 913. Redirect service 913 may include one or more features of redirect service 205 (shown in FIGS. 2 and 5).

At $t_1$, redirect service 913 receives the redirect URL from mobile device 911. In response to receiving the redirect URL, redirect service 913 may employ artificial intelligence, such as a DNN or one or more machine learning algorithms to formulate content that will be presented on mobile device 911 in response to scanning label 901. To formulate the content, redirect service 913 may utilize CIG 903 to compute an intent index score for the scan event at $t_0$. Redirect service 913 may compute the intent index score based on scan event details 905.

FIG. 9 shows that at $t_2$, based on CIG 903 and scan event details 905, redirect service 913 has computed an intent index score of 93/100 (relatively high) with respect to user 909 taking action regarding an available a "dine-in pizza" offer 917 associated with scanned label 901. Redirect service 913 may compute, based on CIG 903 and scan event details 905, that user 909 has an intent index score of 27/100 (relatively low) with respect to taking action regarding an available "deliver pizza" offer 921.

FIG. 9 shows that at $t_3$, content 915, is presented on mobile device 911. Content 915 includes "dine-in pizza" offer 917. Redirect service 913 may formulate content 915 and trigger presentation of content 915 on mobile device 911 in real-time. Real-time may be defined as a total duration of ≤100 milliseconds between $t_0$ and $t_3$.

Figure 10:
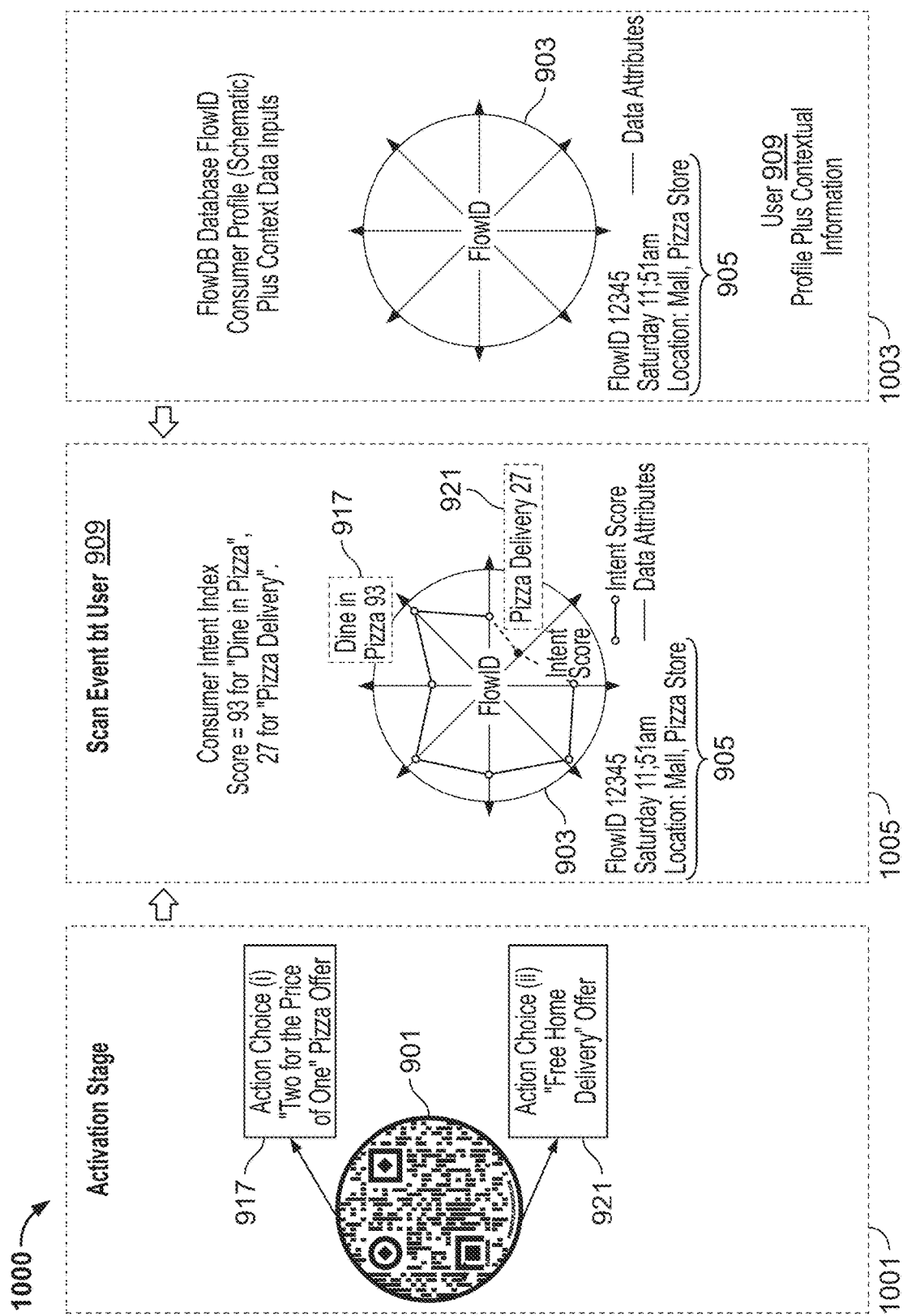
FIG. 10 shows an illustrative system and process in accordance with principles of the disclosure.

FIG. 10 shows illustrative computational process 1000. Computational process 1000 may be executed by redirect service 913 (shown in FIG. 9). At step 1001, redirect service 913 activates label 901. For example, a proprietor of pizza restaurant 907 may affix label 901 to store window 906. The proprietor may activate label 901 in connection with potential offers 917 and 921.

An illustrative activation process may include the proprietor scanning label 901. Label 901 may be associated with an activation code (not shown). The activation code may be presented on packaging associated with label 901. For example, label 901 may be printed on a sticker. The packaging of the sticker (e.g., removeable backing) may include the activation code.

Label 901 may encode a redirect URL. Scanning the redirect URL may trigger the scanning device to submit scan event details including the redirect URL to redirect service 913. In response to receiving the scan event details, redirect service 913 may determine that non-activated label 901 has been scanned. Redirect service 913 may determine that label 901 has not yet been linked to one or more landing pages or other content/service.

Redirect service 913 (which may include a software application running on the proprietor's mobile device) may request an activation code. Redirect service 913 may provide instructions to the mobile device of the proprietor to enter the activation code packaged with label 901. The prompts may ask the proprietor to confirm a placement location of label 901 in store window 906. Redirect service 913 may prompt the proprietor for additional address details associated with store window 906 such as floor or suite number. Redirect service 913 may prompt the proprietor to capture a picture of label 901 affixed to store window 906.

During (or after) activation of label 901, the proprietor may submit offers 917 and 921 to redirect service 913. The proprietor may request redirect service 913 associated label 901 with offers 917 and 921. The proprietor may request that redirect service 913 determine which of offers 917 and 921 to present in response to scans of label 901. Based on scan event details, such as a mobile device identifier or biometrics, redirect service 913 may determine whether label 901 is being scanned by the proprietor or a potential customer of pizza restaurant 907.

Redirect service 913 may save activation inputs received from the proprietor in a multi-dimensional matrix. Redirect service 913 may save activation inputs received from the proprietor in user profile for the proprietor. Redirect service 913 may formulate content to associate with label 901 based on the scan event details associated with a future scan of label 901. Redirect service may formulate content to associate with label 901 in response to a future scan by applying one or more machine learning algorithms to attributes, such as the activation inputs, stored in the multi-dimensional matrix.

After activation step 1001, at step 1003, user 909 initiates a scan of label 901. Label 901, when scanned by mobile device 911 of user 909, triggers mobile device 911 to submit the redirect URL encoded in label 901 to redirect service 913. Step 1003 also shows that user 909 is associated with CIG 903. Attributes (e.g., scan event details) included in CIG 903 may be indexed by a unique identifier (e.g., FlowID) assigned to user 909. CIG 903 may include one or more logical relationships among attributes stored in CIG 903. CIG 903 may correlate offline activity of user 909 (e.g., scanned label locations) to online activity of user 909 (action taken in response to a scan event).

At step 1005, in response to receiving the redirect URL, redirect service 913 may employ artificial intelligence, such as a DNN or one or more machine learning algorithms to compute which of offers 917 and 921 will be presented to user 909 on mobile device 911 in response to the scanning of label 901. To formulate the content, redirect service 913 may utilize relationships stored in CIG 903 to compute an intent index score for the scan event. Redirect service 913 may compute the intent index score based on scan event details 905 captured when user 909 scans label 901.

Step 1005, shows that based on CIG 903 and scan event details 905, redirect service 913 has computed an intent index score of 93/100 (relatively high) with respect to "dine-in pizza" offer 917 associated with scanned label 901. Redirect service 913 may determine, based on CIG 903 and scan event details 905, that user 909 has an intent index score of 21/100 (relatively low) with respect to taking action regarding an available "deliver pizza" offer 921.

Figure 11:
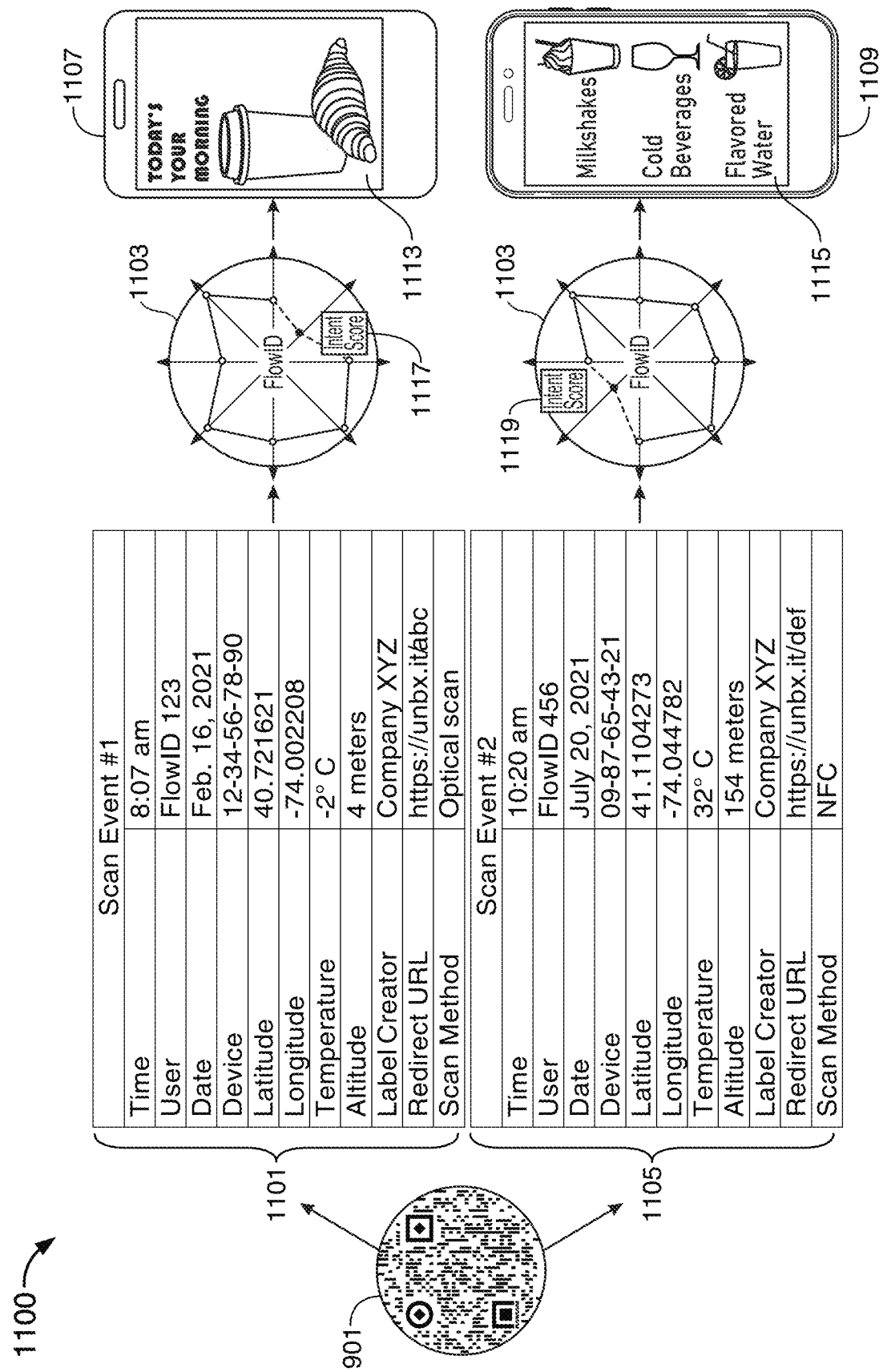
FIG. 11 shows an illustrative system and process in accordance with principles of the disclosure.

FIG. 11 shows illustrative scenario 1100. Scenario 1100 shows that scan event details 1101 may be captured in response to device 1107 scanning label 901. Scenario 1100 shows that based on scan event details 1101, content 1113 is presented on scanning device 1107. Scenario 1100 shows that scan event details 1105 may be captured in response device 1109 scanning label 901. Scenario 1100 shows that based on scan event details 1105, content 1115 is presented on scanning device 1109.

Based on scan event details 1101 and attribute relationships stored in CIG 1103, redirect service 205 (shown in FIG. 2) may compute intent index score 1117. Based on scan event details 1105 and attribute relationships stored in CIG 1103, redirect service 205 may compute intent index score 1119. CIG 1103 may include logical relationships linking offline activity of users to online activity of the users. Redirect service 205 may apply a machine learning algorithm, such as a DNN to scan event details 1101 and formulate content 1113 presented on scanning device 1107 in response to scan event #1. The redirect service may apply a machine learning algorithm, such as a DNN to scan event details 1105 and formulate content 1115 presented on scanning device 1109 in response to scan event #2. CIG 1103 may correlate scan event details 1101 and 1105 to online activity of users after the users are presented with content 1113 and 1115.

Redirect service 205 may apply machine learning algorithms to scan event details 1101 and 1105 to generate CIG 1103. CIG 1103 may correlate scan event details 1101 and 1105 to each other. CIG 1103 may correlate scan event details 1101 and 1105 to each other and to user profiles or other data stored in data lake 213. CIG 1103 may link trackable electronic activity of users (e.g., scan event details 1101 and/or 1105) to one or more static machine-readable optical labels, such as label 901. CIG 1103 may link trackable electronic activity of users to a static machine-readable optical positioned at a fixed location (e.g., label 901 positioned in store window 906).

Redirect service 205 may utilize CIG 1103 to compute index scores (e.g., 1117 and 1119) for potential actions or content that may be presented to a user in response to a scan event. For example, scenario 1100 shows that based on temperature (cold) and time (early morning), content 1113 is presented on scanning device 1107. Scenario 1100 shows that based on temperature (hot) and time (mid-morning), content 1115 is presented on scanning device 1109.

"FlowID" shown in FIG. 11 may represent a unique identifier that links a user profile to attributes within CIG 1103. In some embodiments, within CIG 1103, a FlowID may represent a unique identifier that links a machine-readable label to activity of users after scanning the label. For example, CIG 1103 may correlate scan event details 1101 to scan event details 1105 and then be utilized to formulate content in response to future scans of label 901.

In some embodiments, a user interface and/or application program interface ("API") may provide access to redirect service 205. Access to redirect service 205 via an API may allow third-party applications to submit additional user attributes to redirect service 205. The additional attributes may be used to formulate or update CIG 1103. Access to redirect service 205 via the API may allow third-party applications to submit scan event details or other attributes and receive content formulated by redirect service 205 based on CIG 1103.

Figure 12:
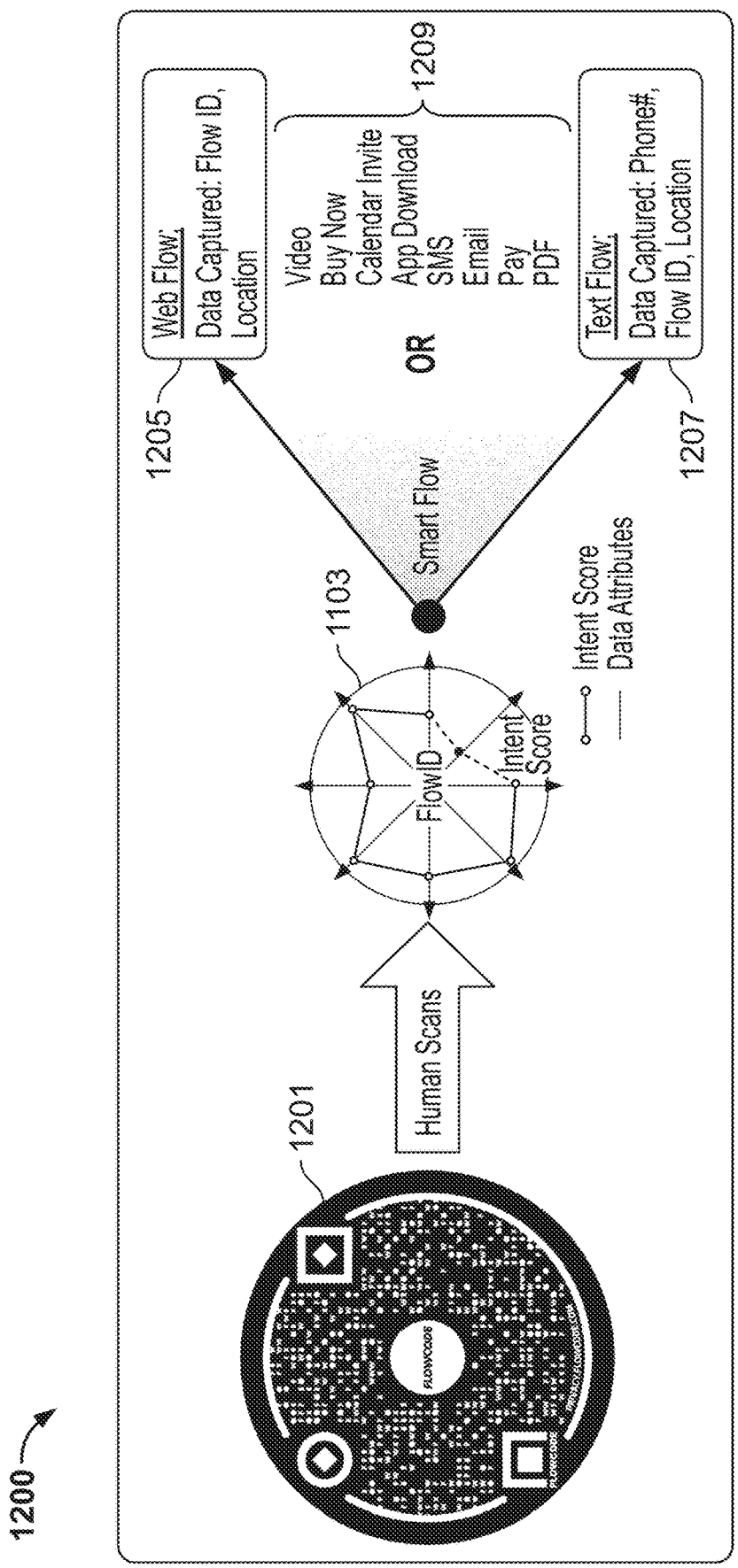
FIG. 12 shows an illustrative system and process in accordance with principles of the disclosure.

FIG. 12 shows illustrative process flow 1200. Process flow 1200 begins when a user scans machine-readable optical label 1201. Information encoded in label 1201 may trigger the scanning device to submit scan event details to a redirect service. The redirect service may apply a machine learning algorithm to CIG 1103 and formulate content 1209 to present in response to the scan of label 1201.

FIG. 12 shows that scan event details may include an interface used to communicate with a redirect service. For example, scan event details 1205 indicate the scanning device is communicating with a redirect service using a web-based communication flow. Scan event details 1207 indicate the scanning device is communicating with redirect service using a text message communication flow. Redirect service may formulate content 1209 to present in response to the scan of label 1201 based on scan event details 1207 or 1209.

For example, if scan event details 1207 are received, redirect service may determine that a user should be presented with offer 917. The redirect service may respond with a text message that presents offer 917 and allows the user to respond to the text message by "replying 'yes' to order now." If scan event details 1207 are received, redirect service may determine that a user should be presented with offer 921. The redirect service may respond by opening a webpage that presents a menu for pizza restaurant 907.

Figure 13:
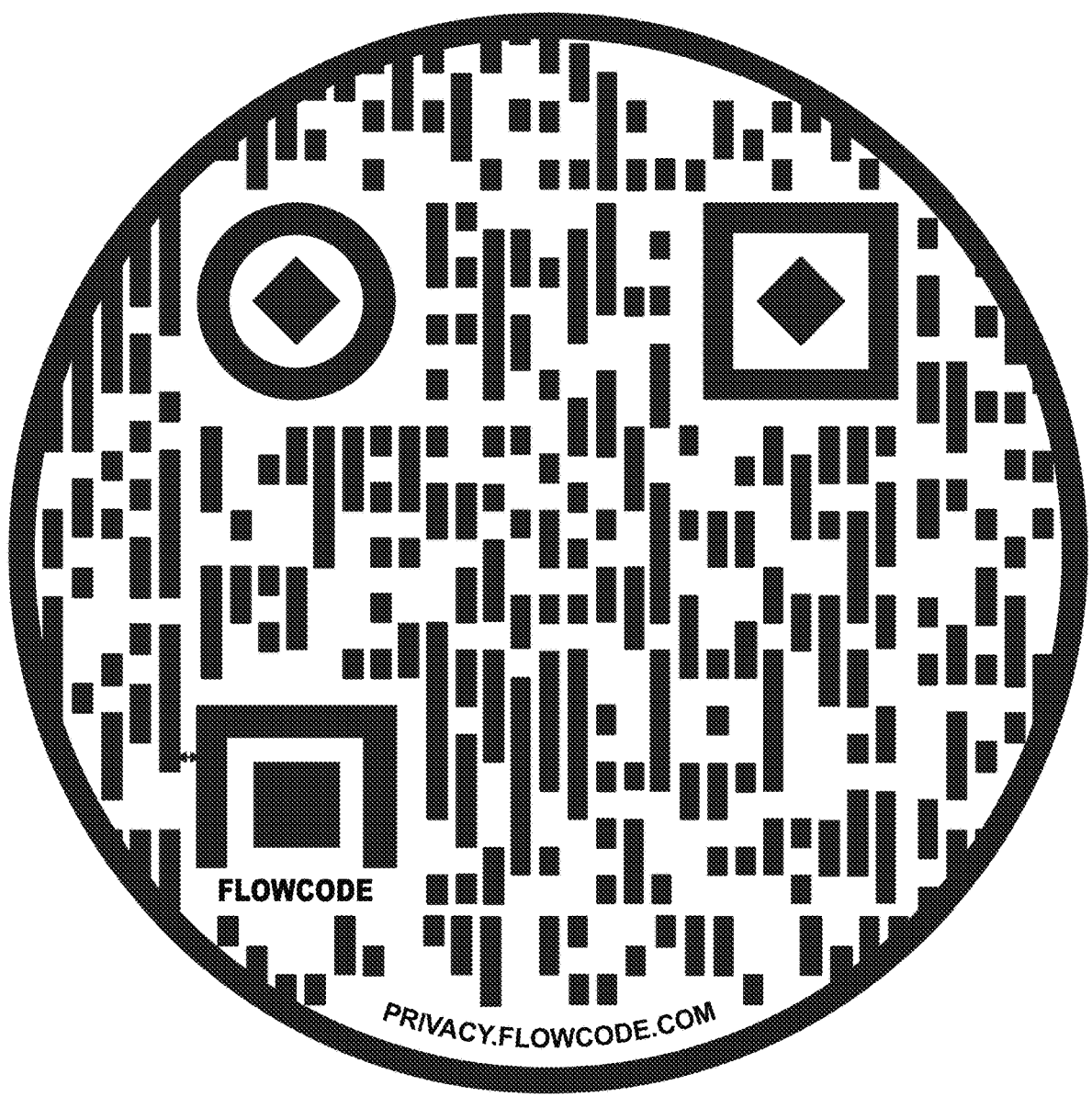
FIG. 13 shows an illustrative machine-readable label in accordance with principles of the disclosure.
Figure 14:
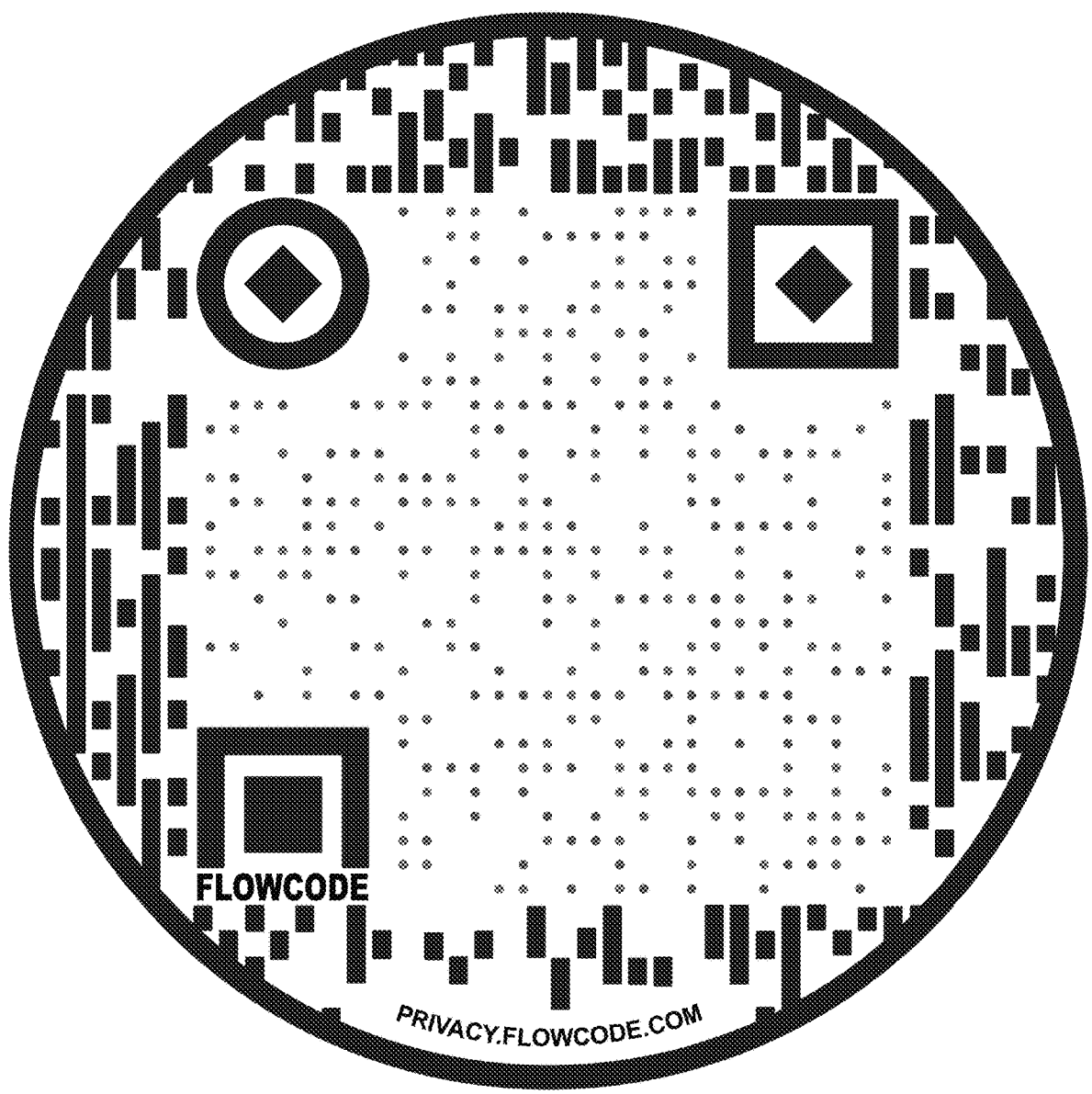
FIG. 14 shows an illustrative machine-readable label in accordance with principles of the disclosure.
Figure 15:
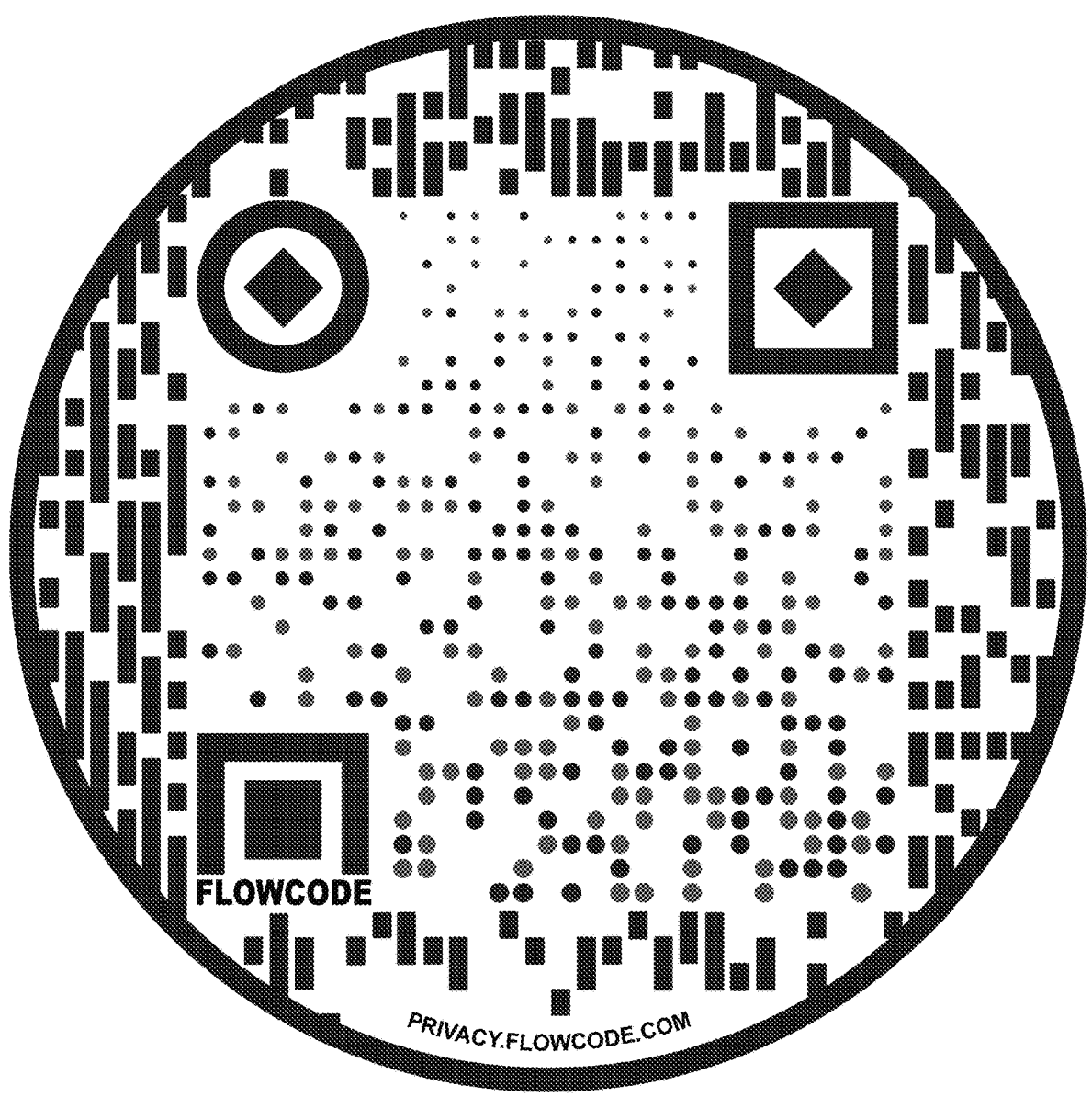
FIG. 15 shows an illustrative machine-readable label in accordance with principles of the disclosure.

FIGS. 13-15 shows illustrative machine-readable labels that may be scanned during a scan event. FIGS. 13-15 show illustrative static labels that may each have a different appearance and encode identical information. For example, each of the labels shown in FIGS. 13-15 may encode the same redirect URL. Despite differences in appearance, each of the labels shown in FIGS. 13-15 may be the same static label because they each encode the identical information.

Labels presented on different substrates yet encode the same information may be considered the identical "static" label. For example, the label shown in FIG. 13 may be presented on a storefront window. The label shown in FIG. 14 may be displayed on an electronic billboard. The label shown in FIG. 15 may be presented during a TV commercial or embedded in a video stream.

Figure 16:
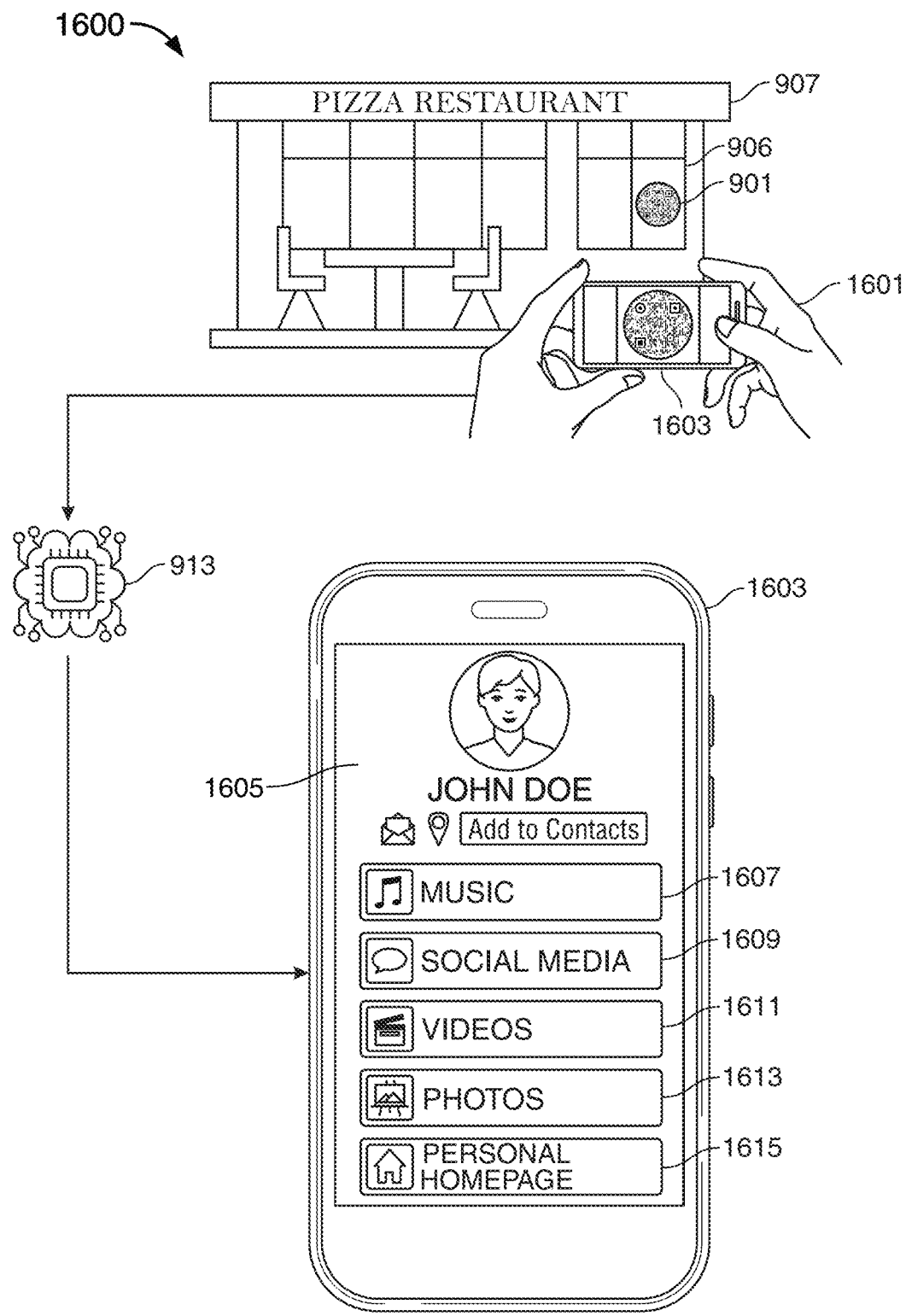
FIG. 16 shows an illustrative system and process in accordance with principles of the disclosure.

FIG. 16 shows illustrative scenario 1600. In scenario 1600, user 1601 scans label 901 (also shown in FIG. 9) affixed to window 906 of pizza restaurant 907. Scenario 1600 shows that redirect service 913 formulates content that will be presented on mobile device 1603 in response to user 1601 scanning label 901. Scenario 1600 shows that user 1601 (in contrast to user 909) is presented with content 1605. Content 1605 includes a target landing page about "John Doe." John Doe may be a founder or proprietor of pizza restaurant 907. Redirect service 913 may formulate content 1605 based on one or more scan details associated with the scan of label 901 by mobile device 1603.

For example, user 1601 may have scanned label 901 at time when pizza restaurant 907 is closed. Redirect service 913 may determine that user 1601 has dietary restrictions and it is unlikely user 1601 is interested in ordering food from pizza restaurant 907. Redirect service 913 may determine that user 1601 has published various biographical articles and may be interested in the founder of pizza restaurant 907. Redirect service 913 may determine user 1601 has recently searched online for information regarding the founder of pizza restaurant 907. Content 1605 formulated by redirect service 913 for user 1601 includes links to information associated with John Doe, the founder or proprietor of pizza restaurant 907. Such links provide access to information about John Does, including music 1607, social media profile(s) 1609, videos 1611, photos 1613 and John Doe's personal homepage 1615.

Figure 17:
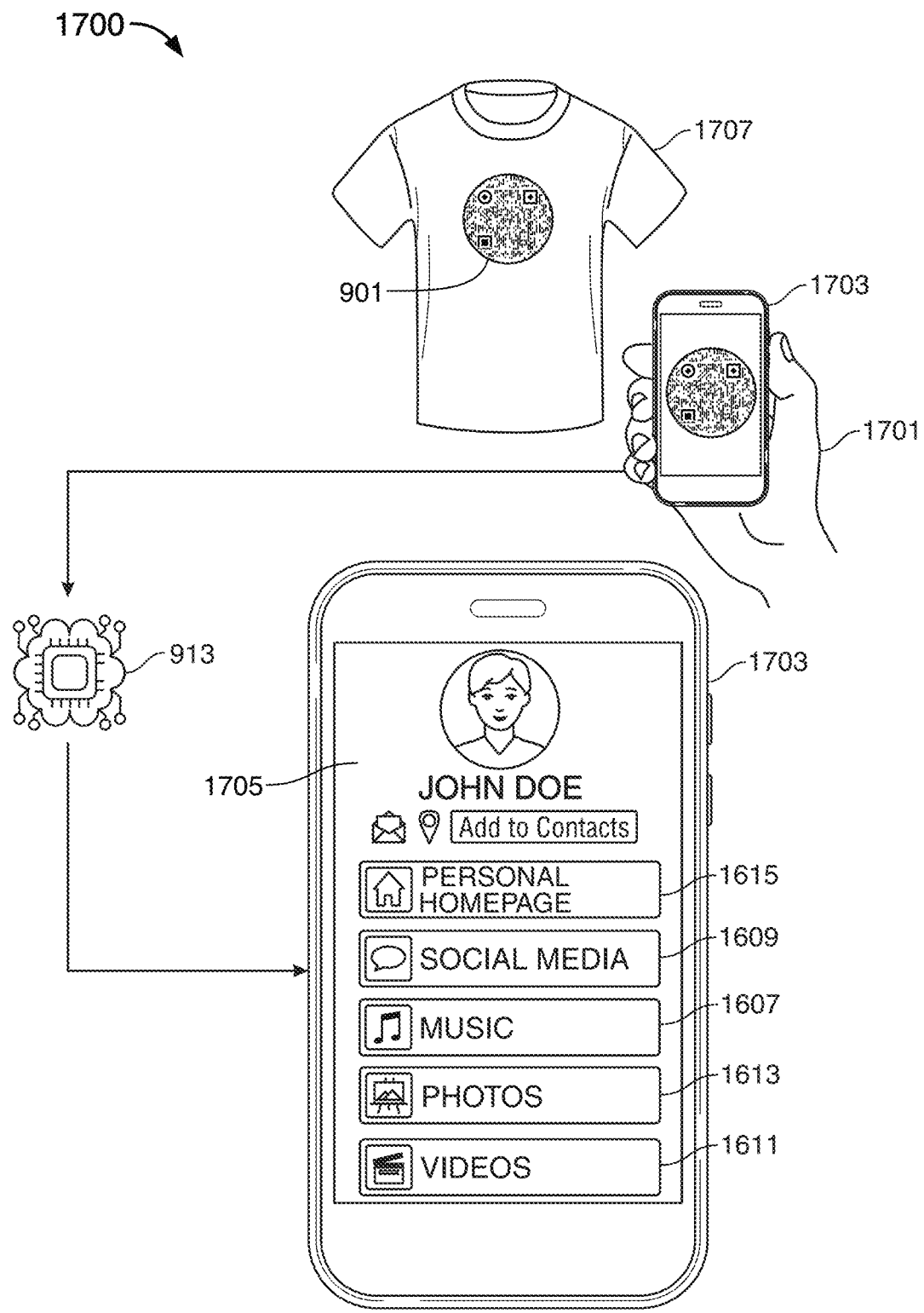
FIG. 17 shows an illustrative system and process in accordance with principles of the disclosure.

FIG. 17 shows illustrative scenario 1700. Scenario 1700 shows that user 1701 has scanned label 901 (also shown in FIGS. 9 and 16) printed on t-shirt 1707 using mobile device 1703. Scenario 1700 shows that redirect service 913 formulates content that will be presented on mobile device 1703 in response to user 1701 scanning label 901. Scenario 1700 shows that user 1701 (in contrast to user 909 or user 1601) is presented with content 1705. Content 1705 includes a target landing page about "John Doe." John Doe may be a founder or proprietor of pizza restaurant 907. Redirect service 913 may formulate content 1705 based on one or more scan details associated with the scan of label 901 by mobile device 1703.

Both content 1605 and content 1705 include links to information associated with John Doe. Both content 1605 and content 1705 include links to music 1607, social media profile(s) 1609, videos 1611, photos 1613 and John Doe's personal homepage 1615. However, the links included in content 1705 are ordered differently than the links in content 1605.

Links displayed to user 1601 may be ordered based on an intent index score of each link computed by redirect service 913 for user 1601. The order of links in content 1605 may be determined by scan event details captured by mobile device 1603 a CIG or a user profile associated with user 1601. The order of links presented in content 1605 may be determined based on a response to an earlier scan by mobile device 1603 that triggered a display of a target landing page that included information about John Doe. The links associated with content 1605 may be ordered based on actions of other users (e.g., user 1701) when viewing a target landing page about John Doe (e.g., content 1705).

Links displayed to user 1701 may be ordered based on an intent index score of each link computed by redirect service 913 for user 1701. The order of links in content 1705 may be determined by scan event details captured by mobile device 1703 a CIG or a user profile associated with user 1701. The order of links in content 1705 may be determined based on a response to an earlier scan by mobile device 1703 that triggered a display of a target landing page that included information about John Doe. The links associated with the target webpage may be ordered based on actions of other users (e.g., user 1601) when viewing a target landing page about John Doe (e.g., content 1605).

Figure 18:
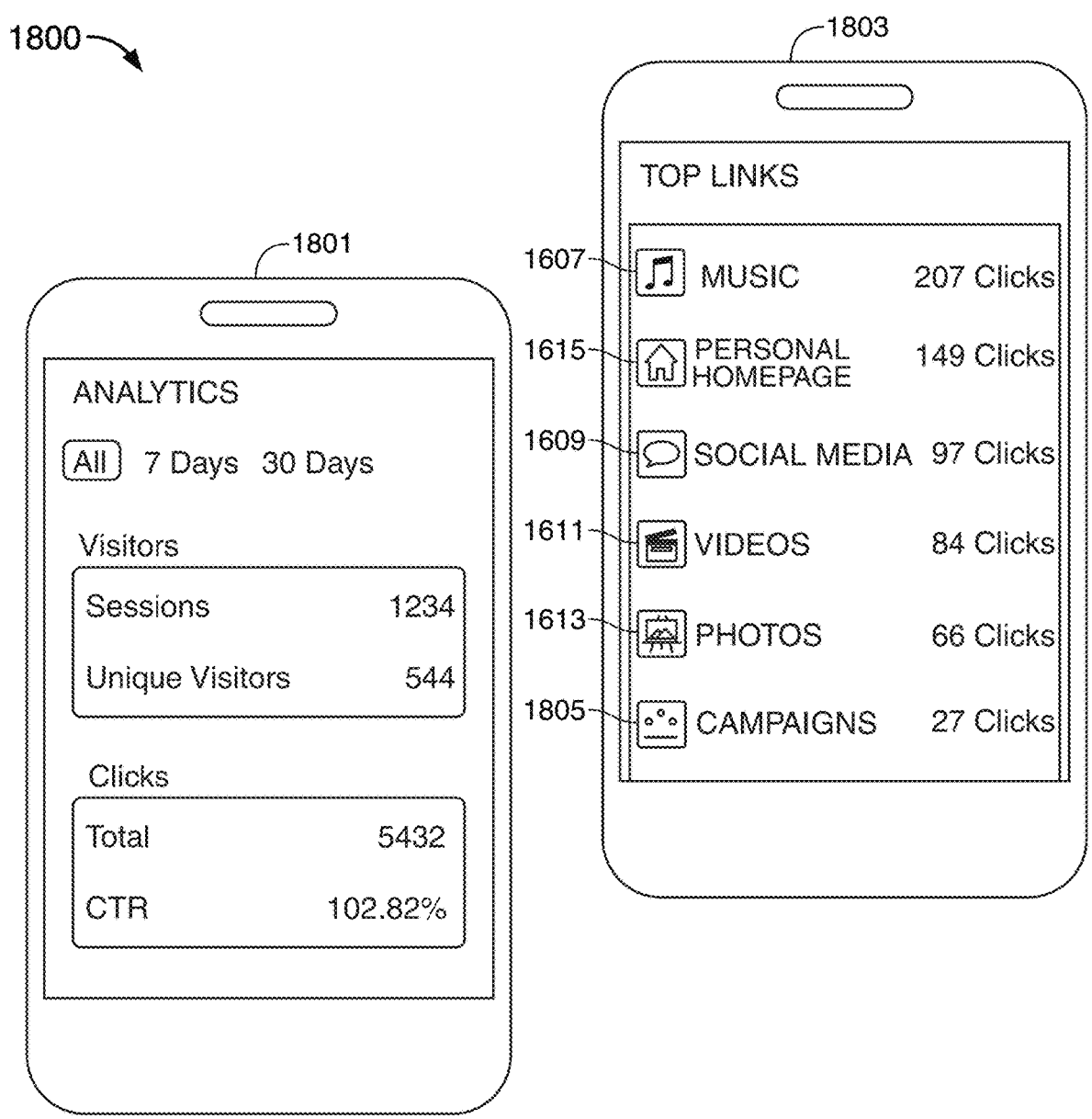
FIG. 18 shows illustrative information generated in accordance with principles of the disclosure.

FIG. 18 shows illustrative performance metrics 1801 and 1803 that may be captured based on user activity associated with the target landing page about John Doe (e.g., content 1605 and content 1705). Performance metrics 1800 may be captured based on tracking code embedded in a target landing page about John Doe (e.g., content 1605 or content 1705). Performance metrics 1801 show statistics associated with activity of visitors on the target landing page about John Doe. Performance metrics 1803 show user activity with respect to links 1607, 1609, 1611, 1613 and 1615 included within content 1605 and content 1705. Performance metrics 1805 may relate a number of users that have scanned label 901 and presentation to the scanning users of content about John Doe.

A target landing page associated with a scan of a label may be changed based on performance metrics (e.g., performance metrics 1800) associated with a landing page presented in response to the scan. Illustrative performance metrics associated with a landing page may include time users spend on a presented landing page and user engagement with content presented on a landing (interaction with a chatbot or add to cart or other activity available on landing page). In response to a scan of a label, methods may include directing users to a target landing page that is associated with target performance metrics.

It is intended that this disclosure, together with the drawings, be considered exemplary only, where exemplary means an example. While this disclosure contains many specifics, these should not be construed as limitations, but rather as descriptions of features that may be specific to particular embodiments. Certain features that are described in disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Thus, methods and apparatus for REFACTORING OF STATIC MACHINE-READABLE CODES are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. An artificial intelligence ("AI") redirect system for dynamically generating a customized landing page in response to scanning a static machine-readable optical label, the redirect system comprising a processor and a non-transitory memory with instructions stored thereon, wherein the instructions upon execution by the processor, cause the processor to:
   capture a scan of the static machine-readable optical label;
   extract a default Uniform Resource Locator ("URL") encoded in the static machine-readable optical label;
   transfer, to a redirect service:
      the default URL; and
      one or more scan event details;
   receive a redirect URL from the redirect service;
   load a target landing page corresponding to the redirect URL; and
   load a default webpage when >100 milliseconds elapse from the capture of the scan without receiving the redirect URL.

2. The AI redirect system of claim 1, wherein the default webpage corresponds to the default URL encoded in the static machine-readable optical label.

3. The AI redirect system of claim 1 wherein the instructions upon execution by the processor, cause the processor to:

track activity on the target landing page;
transmit the activity to the redirect service; and
based on the activity received by the redirect service, dynamically update, an offline to online intent index.

4. The AI redirect system of claim 3 wherein the target landing page is a first target landing page and the scan is a first scan, the instructions upon execution by the processor cause the processor to load a second target landing page in response to capturing a second scan of the static machine-readable optical label, and wherein the second target landing page is determined based on the offline to online intent index.

5. The AI redirect system of claim 1 wherein the instructions upon execution by the processor, cause the processor to transfer the one or more scan event details to the redirect service by appending the one or more scan event details to the default URL.

6. The AI redirect system of claim 1 wherein the static machine-readable label is a first static machine-readable label and the scan is a first scan, the instructions upon execution by the processor, cause the processor to load the target landing page in response to capturing a second scan of a second static machine-readable optical label.

7. The AI redirect system of claim 6, wherein the second static machine-readable optical label and the first static machine-readable optical label encode the default URL.

8. The AI redirect system of claim 6, wherein the default URL is a first default URL and the second static machine-readable optical label encodes a second default URL.

9. The AI redirect system of claim 4 wherein first content displayed on the first landing page is different from second content displayed on the second landing page.

10. An artificial intelligence ("AI") redirect system for dynamically generating a customized landing page in response to scanning a static machine-readable optical label, the redirect system comprising a processor and a non-transitory memory with instructions stored thereon, wherein the instructions upon execution by the processor, cause the processor to:
capture a scan of the static machine-readable optical label;
extract a default Uniform Resource Locator ("URL") encoded in the static machine-readable optical label;
transfer, to a redirect service:
the default URL; and
one or more scan event details;
receive a redirect URL from the redirect service;
load a target landing page corresponding to the redirect URL;
track activity on the target landing page;
transmit the activity to the redirect service; and
based on the activity received by the redirect service, dynamically update an offline to online intent index.

11. The AI redirect system of claim 10 wherein the instructions upon execution by the processor, cause the processor to transfer the one or more scan event details to the redirect service by appending the one or more scan event details to the default URL.

12. The AI redirect system of claim 10, wherein the offline to online intent index links trackable electronic activity on the target landing page to the one or more scan event details.

13. The AI redirect system of claim 10, wherein the scan is a first scan of the static machine-readable optical label, the redirect URL is a first redirect URL, the target landing page is a first target landing page and the one or more scan event details are a first set of scan event details, the instructions upon execution by the processor, cause the processor to:
capture a second scan of the static machine-readable optical label;
extract the default URL encoded in the static machine-readable optical label;
transfer, to the redirect service:
the default URL; and
a second set of scan event details;
receive a second redirect URL from the redirect service; and
load a second target landing page corresponding to the second redirect URL.

14. The AI redirect system of claim 13 wherein first content displayed on the first target landing page is different from second content displayed on the second target landing page.

15. The AI redirect system of claim 13 wherein the first scan is captured by a first device and the second scan is captured by a second device.

16. The AI redirect system of claim 14 wherein, the second content comprises a reordering of links presented in the first content.

17. The AI redirect system of claim 13 wherein the second redirect URL is determined based on the second set of scan event details and the offline to online intent index.

18. The AI redirect system of claim 10, wherein the scan is a first scan, the static machine-readable optical label is a first static machine-readable optical label, the redirect URL is a first redirect URL and the target landing page is a first target landing page, the instructions upon execution by the processor, cause the processor to:
capture a second scan of a second static machine-readable optical label, wherein the second static machine-readable optical label encodes the default URL;
extract the default URL encoded in the second static machine-readable optical label;
transfer the default URL to the redirect service;
receive a second redirect URL from the redirect service; and
load a second target landing page corresponding to the second redirect URL.

19. The AI redirect system of claim 18, wherein the second target landing page is formulated based on the offline to online intent index.

20. The AI redirect system of claim 18, wherein the instructions upon execution by the processor, cause the processor to:
track activity on the second target landing page;
transmit the activity to the redirect service; and
based on the activity on the second target landing page, dynamically update the offline to online intent index.

* * * * *